(12) United States Patent
Xu et al.

(10) Patent No.: US 12,402,027 B2
(45) Date of Patent: Aug. 26, 2025

(54) COMMUNICATION METHOD AND RELATED APPARATUS

(71) Applicant: HUAWEI TECHNOLOGIES CO., LTD., Shenzhen (CN)

(72) Inventors: Bin Xu, Beijing (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 471 days.

(21) Appl. No.: 18/076,515

(22) Filed: Dec. 7, 2022

(65) Prior Publication Data
US 2023/0099586 A1  Mar. 30, 2023

Related U.S. Application Data

(63) Continuation of application No. PCT/CN2021/099106, filed on Jun. 9, 2021.

(30) Foreign Application Priority Data

Jun. 10, 2020  (CN) .......................... 202010525277.1

(51) Int. Cl.
H04W 28/02 (2009.01)
H04W 76/15 (2018.01)
H04W 88/04 (2009.01)

(52) U.S. Cl.
CPC ....... *H04W 28/0205* (2013.01); *H04W 76/15* (2018.02); *H04W 88/04* (2013.01)

(58) Field of Classification Search
CPC .. H04W 28/0205; H04W 76/15; H04W 88/04
See application file for complete search history.

(56) References Cited

U.S. PATENT DOCUMENTS

2018/0139682 A1   5/2018  Xu et al.
2019/0239279 A1*  8/2019  Shi .................. H04W 80/02
(Continued)

FOREIGN PATENT DOCUMENTS

CN   110351024 A   10/2019
CN   110912655 A    3/2020
(Continued)

OTHER PUBLICATIONS

Huawei et al: "Key points on sidelink relay SID", 3GPP Draft; RP-192791, Dec. 2, 2019, XP051834383, total 7 pages.
(Continued)

*Primary Examiner* — Ajay Cattungal
(74) *Attorney, Agent, or Firm* — HAUPTMAN HAM, LLP

(57) ABSTRACT

This application provides a communication method, includes: sending N data packets in M data packets to an access network device through an air interface; sending M-N data packets in the M data packets to the access network device over a first relay link, where the first relay link includes a first link and a second link, the first link is a link between a terminal device and a first relay terminal, and the second link is a link between the first relay terminal and the access network device; and sending request information to the access network device when a link quality of the first link is less than or equal to a first preset threshold, where the request information is for requesting to update the first relay link to a second relay link.

20 Claims, 8 Drawing Sheets

(56) References Cited

U.S. PATENT DOCUMENTS

| | | | |
|---|---|---|---|
| 2019/0379519 A1* | 12/2019 | Shi | H04L 5/0098 |
| 2020/0245189 A1* | 7/2020 | Tang | H04L 1/1614 |
| 2020/0358558 A1* | 11/2020 | Tang | H04L 5/006 |
| 2021/0126746 A1* | 4/2021 | Li | H04L 5/0055 |
| 2021/0144781 A1* | 5/2021 | Xu | H04W 24/02 |
| 2021/0184788 A1* | 6/2021 | Lu | H04L 1/0025 |
| 2021/0250810 A1* | 8/2021 | Tang | H04L 1/08 |
| 2021/0345449 A1* | 11/2021 | Shi | H04L 5/0098 |
| 2021/0410218 A1* | 12/2021 | Fu | H04W 76/15 |
| 2022/0015172 A1* | 1/2022 | Xu | H04L 5/0053 |

FOREIGN PATENT DOCUMENTS

| | | |
|---|---|---|
| CN | 110913434 A | 3/2020 |
| WO | 2019213898 A1 | 11/2019 |
| WO | 2020067242 A1 | 4/2020 |

OTHER PUBLICATIONS

Extended European Search Report issued in corresponding European Application No. 21820827.0, dated Oct. 12, 2023, pp. 1-10.

Oppo, Discussion on redundant connectivity support in IAB. 3GPP TSG-RAN2 Meeting AH#1, Vancouver, Canada, Jan. 22-26, 2018, R2-1800157, 3 pages.

3GPP TS 38.323 V15.8.0 (Jun. 2021), 3rd Generation Partnership Project; Technical Specification Group Radio Access Network; NR; Packet Data Convergence Protocol (PDCP) specification (Release 15), 26 pages.

3GPP TS 36.323 V16.0.0 (Mar. 2020), 3rd Generation Partnership Project; Technical Specification Group Radio Access Network; Evolved Universal Terrestrial Radio Access (E-UTRA); Packet Data Convergence Protocol (PDCP) specification(Release 16), 56 pages.

International Search Report issued in corresponding International Application No. PCT/CN/2021/099106, dated Sep. 7, 2021, pp. 1-9.

India Office Action issued in corresponding India Application No. 202217073664, dated Sep. 18, 2024, pp. 1-7.

* cited by examiner

COMMUNICATION METHOD AND RELATED APPARATUS

CROSS-REFERENCE TO RELATED APPLICATIONS

This application is a continuation of International Application No. PCT/CN2021/099106, filed on Jun. 9, 2021, which claims priority to Chinese Patent Application No. 202010525277.1, filed on Jun. 10, 2020. The aforementioned applications are hereby incorporated by reference in their entireties.

TECHNICAL FIELD

This application relates to the field of communications technologies, and in particular, to a communication method and a related apparatus.

BACKGROUND

Currently, a carrier aggregation (CA) duplication transmission technology or a dual connectivity (DC) duplication transmission technology is usually used to improve data transmission reliability.

However, because the CA duplication transmission technology is easily affected by an obstruction, in some complex environments, the CA duplication transmission technology cannot meet a reliability requirement of service transmission. Specifically, when there is an obstruction between a base station and user equipment, even if there are a plurality of carriers between the base station and the user equipment, there is a high probability that no carrier can operate. Therefore, communication reliability cannot be ensured. In addition, in the DC duplication transmission technology, because locations of two base stations communicating with user equipment are different, a problem caused by an obstruction may be resolved to some extent. However, it is difficult to deploy the DC in a plurality of scenarios due to deployment costs or environment limitations. Therefore, using the DC duplication transmission technology to resolve the problem caused by an obstruction also has some limitations. In this case, a problem of how to improve data transmission reliability when there is an obstruction needs to be resolved urgently.

SUMMARY

This application provides a communication method and a related apparatus. Through implementation of embodiments of this application, a problem of unreliable data transmission caused by an obstruction occurs less frequently.

According to a first aspect, this application provides a communication method. The method is applied to a terminal device and includes:
  determining a first data packet, obtaining M data packets through duplicating the first data packet, and sending the M data packets to an access network device in a duplication transmission mode, where M is an integer greater than 1, where
  the sending the M data packets to an access network device in a duplication transmission mode includes:
  sending N data packets in the M data packets to the access network device through an air interface, where N is an integer greater than 0 and less than M; and
  sending M-N data packets in the M data packets to the access network device over a first relay link, where the first relay link includes a first link and a second link, the first link is a link between the terminal device and a first relay terminal, and the second link is a link between the first relay terminal and the access network device; and
  sending request information to the access network device when a link quality of the first link is less than or equal to a first preset threshold, where the request information is for requesting to update the first relay link to a second relay link, the second relay link includes a third link and a fourth link, the third link is a link between the terminal device and a second relay terminal, and the fourth link is a link between the second relay terminal and the access network device.

It can be learned that in the foregoing technical solution, a data packet is duplicated, where at least one data packet obtained through duplication is transmitted through the air interface, and at least one data packet obtained through duplication is transmitted over the first relay link. In this way, a same data packet is duplicated and transmitted on different paths, so that a problem of unreliable data transmission caused by an obstruction occurs less frequently. In addition, when a quality of an existing relay link is poor, dynamic update of the relay link avoids a problem that duplication transmission over a relay link cannot be performed due to a poor link quality when there is an obstruction, and also avoids a problem that data transmission is unreliable when the duplication transmission over the relay link cannot be performed.

With reference to the first aspect, in a possible implementation, the first data packet belongs to a first service, and the method further includes:
  sending first indication information to the access network device.

The first indication information includes at least one of the following: a type identifier of the first service, a quality of service QoS requirement of the first service, a type of the terminal device, location information of the terminal device, or the link quality of the first link.

It can be learned that in the foregoing technical solution, the terminal device sends indication information to the access network device, so that the access network device can determine, based on the indication information, that service data corresponding to a service needs to be transmitted in a corresponding transmission mode. For example, data transmission needs to be performed in the duplication transmission mode through an air interface and over a relay link.

According to a second aspect, this application provides a communication method. The method is applied to a terminal device and includes:
  receiving J data packets sent by an access network device in a duplication transmission mode, where J is an integer greater than 1, where
  the receiving J data packets sent by an access network device in a duplication transmission mode includes:
  receiving, through an air interface, K data packets in the J data packets sent by the access network device, where K is an integer greater than 0 and less than J; and
  receiving J-K data packets in the J data packets over a first relay link, where the first relay link includes a first link and a second link, the first link is a link between the terminal device and a first relay terminal, and the second link is a link between the first relay terminal and the access network device; and
  sending request information to the access network device when a link quality of the first link is less than or equal to a first preset threshold, where the request information is for requesting to update the first relay link to a second relay link, the second relay link includes a third link and a fourth link, the third link is a link between the terminal device and a second relay terminal, and the fourth link is a link between the second relay terminal and the access network device.

It can be learned that in the foregoing technical solution, at least one data packet is transmitted through the air interface, and at least one data packet is transmitted over the first relay link. In this way, a same data packet is duplicated and transmitted on different paths, so that a problem of unreliable data transmission caused by an obstruction occurs less frequently. In addition, when a quality of an existing relay link is poor, dynamic update of the relay link avoids a problem that duplication transmission over a relay link cannot be performed due to a poor link quality when there is an obstruction, and also avoids a problem that data transmission is unreliable when the duplication transmission over the relay link cannot be performed.

With reference to the first aspect or the second aspect, in a possible implementation, the request information includes at least one of the following: an identifier of the second relay terminal, an identifier of a PC5 interface between the terminal device and the second relay terminal, a link identifier of the third link, or a link quality of the third link.

It can be learned that in the foregoing technical solution, a relay link with a poor link quality may be dynamically updated, to avoid the problem that duplication transmission over a relay link cannot be performed due to a poor link quality when there is an obstruction, and avoid the problem that data transmission is unreliable when the duplication transmission over the relay link cannot be performed.

With reference to the first aspect or the second aspect, in a possible implementation, the method further includes:
  sending capability information to the access network device, where the capability information indicates at least one of the following capabilities:
  the terminal device supports communication with the access network device over a relay link;
  the terminal device supports first duplication transmission, where at least one link for the first duplication transmission is a relay link;
  the terminal device supports second duplication transmission, where the second duplication transmission includes at least two links over which carrier aggregation duplication transmission is performed and at least one relay link;
  a maximum quantity of relay links that are used for duplication transmission and that are supported by the terminal device; and
  a maximum quantity of relay terminals that are used for duplication transmission and that are supported by the terminal device.

It can be learned that in the foregoing technical solution, the terminal device reports the capability information, so that the access network device can determine, based on a capability of the terminal device, a transmission mode supported by the terminal device, and further determine a transmission mode to be used for communicating with the terminal device.

With reference to the first aspect or the second aspect, in a possible implementation, the method further includes:
  sending second indication information to the access network device, where the second indication information indicates at least one of the following: an identifier of at least one relay terminal that can establish a relay link with the terminal device, an identifier of a PC5 interface of the at least one relay terminal that can establish the relay link with the terminal device, an identifier of a relay link of the at least one relay terminal that can establish the relay link with the terminal device, and a link quality of at least one relay link that can be established with the terminal device.

It can be learned that in the foregoing technical solution, the terminal device reports, to the access network device, a candidate relay terminal that meets a condition, so that the access network device can select, based on indication information reported by the terminal device, an appropriate relay terminal for the terminal device to perform duplication transmission.

With reference to the first aspect or the second aspect, in a possible implementation, the method further includes:
  receiving third indication information sent by the access network device, where the third indication information indicates an identifier of the first relay terminal that establishes the first relay link with the terminal device, an identifier of a PC5 interface of the first relay link that is established with the terminal device, or an identifier of the first link.

It can be learned that in the foregoing technical solution, the access network device sends related information of a selected relay terminal or relay link to the terminal device, so that the terminal device can learn of a specific relay terminal or relay link that is for performing duplication transmission.

With reference to the first aspect or the second aspect, in a possible implementation, the method further includes:
  sending fourth indication information to the first relay terminal, where the fourth indication information indicates the first relay terminal to establish the second link with the access network device.

It can be learned that in the foregoing technical solution, indication information is sent to a relay terminal, so that the relay terminal can establish the second link with the access network device based on the indication information.

With reference to the first aspect or the second aspect, in a possible implementation, the method further includes:
  receiving configuration information, where the configuration information is for configuring a correspondence between the first link and the second link.

It can be learned that in the foregoing technical solution, the terminal device may learn of a correspondence between links based on the configuration information, to complete duplication transmission over a relay link in a subsequent process.

With reference to the first aspect or the second aspect, in a possible implementation, the method further includes:
  receiving control signaling sent by the access network device, where the control signaling is for activating or deactivating at least one link that is for performing duplication transmission; or
  receiving fifth indication information sent by the first relay terminal, where the fifth indication information is for activating or deactivating at least one link that is for performing duplication transmission.

It can be learned that in the foregoing technical solution, the access network device may send signaling to control whether each link, including a relay link and a non-relay link, for performing duplication transmission is in active mode or deactivated mode.

With reference to the first aspect or the second aspect, in a possible implementation, the method further includes:
  when a first preset condition is met, activating at least one link that is for performing duplication transmission.

The first preset condition includes at least one of the following:
- the link quality of the first link is less than or equal to a first preset quality threshold;
- a link quality of the second link is less than or equal to a second preset quality threshold;
- a bit error rate of transmission of the first data packet is greater than or equal to a preset bit error rate threshold; or
- a quantity of repetitions of the first data packet is greater than or equal to a preset quantity of repetitions.

It can be learned that in the foregoing technical solution, the terminal device may autonomously determine, based on a preset condition, whether to activate the at least one link that is for performing duplication transmission.

According to a third aspect, a communication method is provided. The method is applied to an access network device and includes:
- receiving M data packets sent by a terminal device in a duplication transmission mode, where M is an integer greater than 1, where
- the receiving M data packets sent by a terminal device in a duplication transmission mode includes:
- receiving, through an air interface, N data packets in the M data packets sent by the terminal device, where the M data packets are sent in the duplication transmission mode, and N is an integer greater than 0 and less than M; and
- receiving M-N data packets in the M data packets over a first relay link, where the first relay link includes a first link and a second link, the first link is a link between the terminal device and a first relay terminal, and the second link is a link between the first relay terminal and the access network device; and
- receiving request information, where the request information is for requesting to update the first relay link to a second relay link, the second relay link includes a third link and a fourth link, the third link is a link between the terminal device and a second relay terminal, and the fourth link is a link between the second relay terminal and the access network device.

It can be learned that in the foregoing technical solution, at least one data packet is transmitted through the air interface, and at least one data packet is transmitted over the first relay link. In this way, a same data packet is duplicated and transmitted on different paths, so that a problem of unreliable data transmission caused by an obstruction occurs less frequently. In addition, when a quality of an existing relay link is poor, dynamic update of the relay link avoids a problem that duplication transmission over a relay link cannot be performed due to a poor link quality when there is an obstruction, and also avoids a problem that data transmission is unreliable when the duplication transmission over the relay link cannot be performed.

With reference to the third aspect, in a possible implementation, the M data packets belong to a first service, and the method further includes:
- receiving first indication information sent by the terminal device.

The first indication information includes at least one of the following: a type identifier of the first service, a quality of service QoS requirement of the first service, a type of the terminal device, location information of the terminal device, or a link quality of the first link.

It can be learned that in the foregoing technical solution, the terminal device sends indication information to the access network device, so that the access network device can determine, based on the indication information, that service data corresponding to a service needs to be transmitted in a corresponding transmission mode. For example, data transmission needs to be performed in the duplication transmission mode through an air interface and over a relay link.

According to a fourth aspect, this application provides a communication method. The method is applied to an access network device and includes:
- sending J data packets to a terminal device in a duplication transmission mode, where J is an integer greater than 1, where
- the sending J data packets includes:
- sending K data packets in the J data packets to the terminal device through an air interface, where the J data packets are sent in the duplication transmission mode, J is an integer greater than 1, and K is an integer greater than 0 and less than J; and
- sending J-K data packets in the J data packets to the terminal device over a first relay link, where the first relay link includes a first link and a second link, the first link is a link between the terminal device and a first relay terminal, and the second link is a link between the first relay terminal and the access network device; and
- receiving request information, where the request information is for requesting to update the first relay link to a second relay link, the second relay link includes a third link and a fourth link, the third link is a link between the terminal device and a second relay terminal, and the fourth link is a link between the second relay terminal and the access network device.

It can be learned that in the foregoing technical solution, at least one data packet is transmitted through the air interface, and at least one data packet is transmitted over the first relay link. In this way, a same data packet is duplicated and transmitted on different paths, so that a problem of unreliable data transmission caused by an obstruction occurs less frequently. In addition, when a quality of an existing relay link is poor, dynamic update of the relay link avoids a problem that duplication transmission over a relay link cannot be performed due to a poor link quality when there is an obstruction, and also avoids a problem that data transmission is unreliable when the duplication transmission over the relay link cannot be performed.

With reference to the third aspect or the fourth aspect, in a possible implementation, the request information includes at least one of the following: an identifier of the second relay terminal, an identifier of a PC5 interface between the terminal device and the second relay terminal, a link identifier of the third link, or a link quality of the third link.

It can be learned that in the foregoing technical solution, a relay link with a poor link quality may be dynamically updated, to avoid the problem that duplication transmission over a relay link cannot be performed due to a poor link quality when there is an obstruction, and avoid the problem that data transmission is unreliable when the duplication transmission over the relay link cannot be performed.

With reference to the fourth aspect, in a possible implementation, the J data packets belong to a second service, and the method further includes:
- receiving sixth indication information sent by a core network device; or
- determining, based on a protocol data unit session established between the terminal device and a core network device, to send service data of the second service in the duplication transmission mode.

The sixth indication information includes at least one of the following: a type identifier of the second service or a quality of service QoS requirement of the second service.

It can be learned that in the foregoing technical solution, the access network device can determine that service data corresponding to a service needs to be transmitted in a corresponding transmission mode. For example, data transmission needs to be performed in the duplication transmission mode through an air interface and over a relay link.

With reference to the third aspect or the fourth aspect, in a possible implementation, the method further includes:
receiving capability information sent by the terminal device, where the capability information indicates at least one of the following:
the terminal device supports communication with the access network device over a relay link;
the terminal device supports first duplication transmission, where at least one link for the first duplication transmission is a relay link;
the terminal device supports second duplication transmission, where the second duplication transmission includes at least two links over which carrier aggregation duplication transmission is performed and at least one relay link;
a maximum quantity of relay links that are used for duplication transmission and that are supported by the terminal device; and
a maximum quantity of relay terminals that are used for duplication transmission and that are supported by the terminal device.

It can be learned that in the foregoing technical solution, the terminal device reports the capability information, so that the access network device can determine, based on a capability of the terminal device, a transmission mode supported by the terminal device, and further determine a transmission mode to be used for communicating with the terminal device.

With reference to the third aspect or the fourth aspect, in a possible implementation, the method further includes:
receiving second indication information sent by the terminal device, where the second indication information indicates at least one of the following: an identifier of at least one relay terminal that can establish a relay link with the terminal device, an identifier of a PC5 interface of the at least one relay terminal that can establish the relay link with the terminal device, an identifier of a relay link of the at least one relay terminal that can establish the relay link with the terminal device, and a link quality of at least one relay link that can be established with the terminal device.

It can be learned that in the foregoing technical solution, the terminal device reports, to the access network device, a candidate relay terminal that meets a condition, so that the access network device can select, based on indication information reported by the terminal device, an appropriate relay terminal for the terminal device to perform duplication transmission.

With reference to the third aspect or the fourth aspect, in a possible implementation, the method further includes:
sending third indication information to the terminal device, where the third indication information indicates an identifier of a PC5 interface of the first relay terminal that establishes the first relay link with the terminal device, or an identifier of the first link.

It can be learned that in the foregoing technical solution, the access network device sends related information of a selected relay terminal or relay link to the terminal device, so that the terminal device can learn of a specific relay terminal or relay link that is for performing duplication transmission.

With reference to the third aspect or the fourth aspect, in a possible implementation, the method further includes:
The terminal device sends fourth indication information to the first relay terminal, where the fourth indication information indicates the first relay terminal to establish the second link with the access network device.

It can be learned that in the foregoing technical solution, indication information is sent to a relay terminal, so that the relay terminal can establish the second link with the access network device based on the indication information.

With reference to the third aspect or the fourth aspect, in a possible implementation, the method further includes:
sending configuration information, where the configuration information is for configuring a correspondence between the first link and the second link.

It can be learned that in the foregoing technical solution, the terminal device may learn of a correspondence between links based on the configuration information, to complete duplication transmission over a relay link in a subsequent process.

With reference to the third aspect or the fourth aspect, in a possible implementation, the method further includes:
sending control signaling to the terminal device, where the control signaling is for activating or deactivating at least one link that is for performing duplication transmission; or
sending control signaling to the first relay terminal.

It can be learned that in the foregoing technical solution, the access network device may send signaling to control whether each link, including a relay link and a non-relay link, for performing duplication transmission is in active mode or deactivated mode.

According to a fifth aspect, a terminal device is provided. The terminal device includes a processing module and a transceiver module.

The processing module is configured to: determine a first data packet, and obtain M data packets through duplicating the first data packet, where M is an integer greater than 1.

The transceiver module is configured to send the M data packets to an access network device in a duplication transmission mode.

When sending the M data packets to the access network device in the duplication transmission mode, the transceiver module is configured to:
send N data packets in the M data packets to the access network device through an air interface, where N is an integer greater than 0 and less than M; and
send M-N data packets in the M data packets to the access network device over a first relay link, where the first relay link includes a first link and a second link, the first link is a link between the terminal device and a first relay terminal, and the second link is a link between the first relay terminal and the access network device.

When a link quality of the first link is less than or equal to a first preset threshold, the transceiver module is configured to send request information to the access network device, where the request information is for requesting to update the first relay link to a second relay link, the second relay link includes a third link and a fourth link, the third link is a link between the terminal device and a second relay terminal, and the fourth link is a link between the second relay terminal and the access network device.

With reference to the fifth aspect, in a possible implementation, the first data packet belongs to a first service, and the transceiver module is further configured to send first indication information to the access network device.

The first indication information includes at least one of the following: a type identifier of the first service, a quality of service QoS requirement of the first service, a type of the terminal device, location information of the terminal device, or a link quality of the first link.

According to a sixth aspect, this application provides a terminal device. The terminal device includes a transceiver module.

The transceiver module is configured to receive J data packets sent by an access network device in a duplication transmission mode, where J is an integer greater than 1.

When receiving the J data packets sent by the access network device in the duplication transmission mode, the transceiver module is configured to:

receive, through an air interface, K data packets in the J data packets sent by the access network device, where K is an integer greater than 0 and less than J; and receive J-K data packets in the J data packets over a first relay link, where the first relay link includes a first link and a second link, the first link is a link between the terminal device and a first relay terminal, and the second link is a link between the first relay terminal and the access network device.

When a link quality of the first link is less than or equal to a first preset threshold, the transceiver module is configured to send request information to the access network device, where the request information is for requesting to update the first relay link to a second relay link, the second relay link includes a third link and a fourth link, the third link is a link between the terminal device and a second relay terminal, and the fourth link is a link between the second relay terminal and the access network device.

With reference to the fifth aspect or the sixth aspect, in a possible implementation, the request information includes at least one of the following: an identifier of the second relay terminal, an identifier of a PC5 interface between the terminal device and the second relay terminal, a link identifier of the third link, or a link quality of the third link.

With reference to the fifth aspect or the sixth aspect, in a possible implementation, the transceiver module is further configured to: send capability information to the access network device, where the capability information indicates at least one of the following capabilities:

the terminal device supports communication with the access network device over a relay link;

the terminal device supports first duplication transmission, where at least one link for the first duplication transmission is a relay link;

the terminal device supports second duplication transmission, where the second duplication transmission includes at least two links over which carrier aggregation duplication transmission is performed and at least one relay link;

a maximum quantity of relay links that are used for duplication transmission and that are supported by the terminal device; and a maximum quantity of relay terminals that are used for duplication transmission and that are supported by the terminal device.

With reference to the fifth aspect or the sixth aspect, in a possible implementation, the transceiver module is further configured to: send second indication information to the access network device, where the second indication information indicates at least one of the following: an identifier of at least one relay terminal that can establish a relay link with the terminal device, an identifier of a PC5 interface of the at least one relay terminal that can establish the relay link with the terminal device, an identifier of a relay link of the at least one relay terminal that can establish the relay link with the terminal device, and a link quality of at least one relay link that can be established with the terminal device.

With reference to the fifth aspect or the sixth aspect, in a possible implementation, the transceiver module is further configured to: receive third indication information sent by the access network device, where the third indication information indicates an identifier of the first relay terminal that establishes the first relay link with the terminal device, an identifier of a PC5 interface of the first relay link that is established with the terminal device, or an identifier of the first link.

With reference to the fifth aspect or the sixth aspect, in a possible implementation, the transceiver module is further configured to: send fourth indication information to the first relay terminal, where the fourth indication information indicates the first relay terminal to establish the second link with the access network device.

With reference to the fifth aspect or the sixth aspect, in a possible implementation, the transceiver module is further configured to: receive configuration information, where the configuration information is for configuring a correspondence between the first link and the second link.

With reference to the fifth aspect or the sixth aspect, in a possible implementation, the transceiver module is further configured to:

receive control signaling sent by the access network device, where the control signaling is for activating or deactivating at least one link that is for performing duplication transmission; or receive fifth indication information sent by the first relay terminal, where the fifth indication information is for activating or deactivating at least one link that is for performing duplication transmission.

With reference to the fifth aspect or the sixth aspect, in a possible implementation, the terminal device further includes a processing module, and the processing module is configured to:

when a first preset condition is met, activate at least one link that is for performing duplication transmission.

The first preset condition includes at least one of the following:

the link quality of the first link is less than or equal to a first preset quality threshold;

a link quality of the second link is less than or equal to a second preset quality threshold;

a bit error rate of transmission of the first data packet is greater than or equal to a preset bit error rate threshold; or a quantity of repetitions of the first data packet is greater than or equal to a preset quantity of repetitions.

According to a seventh aspect, an access network device is provided. The access network device includes a transceiver module, and the transceiver module is configured to receive M data packets sent by a terminal device in a duplication transmission mode, where M is an integer greater than 1.

When receiving the M data packets sent by the terminal device in the duplication transmission mode, the transceiver module is configured to:

receive, through an air interface, N data packets in the M data packets sent by the terminal device, where the M data packets are sent in the duplication transmission mode, and N is an integer greater than 0 and less than M; and receive M-N data packets in the M data packets over a first relay link, where the first relay link includes a first link and a second link, the first link is a link between the terminal device and a first relay terminal, and the second link is a link between the first relay terminal and the access network device.

The transceiver module is configured to receive request information, where the request information is for requesting to update the first relay link to a second relay link, the second relay link includes a third link and a fourth link, the third link is a link between the terminal device and a second relay terminal, and the fourth link is a link between the second relay terminal and the access network device.

With reference to the seventh aspect, in a possible implementation, the M data packets belong to a first service, and the transceiver module is further configured to receive first indication information sent by the terminal device.

The first indication information includes at least one of the following: a type identifier of the first service, a quality of service QoS requirement of the first service, a type of the terminal device, location information of the terminal device, or a link quality of the first link.

According to an eighth aspect, this application provides an access network device. The access network device includes a transceiver module, and the transceiver module is configured to send J data packets to a terminal device in a duplication transmission mode, where J is an integer greater than 1.

When sending the J data packets to the terminal device in the duplication transmission mode, the transceiver module is configured to:

send K data packets in the J data packets to the terminal device through an air interface, where the J data packets are sent in the duplication transmission mode, J is an integer greater than 1, and K is an integer greater than 0 and less than J; and send J-K data packets in the J data packets to the terminal device over a first relay link, where the first relay link includes a first link and a second link, the first link is a link between the terminal device and a first relay terminal, and the second link is a link between the first relay terminal and the access network device.

The transceiver module is configured to receive request information, where the request information is for requesting to update the first relay link to a second relay link, the second relay link includes a third link and a fourth link, the third link is a link between the terminal device and a second relay terminal, and the fourth link is a link between the second relay terminal and the access network device.

With reference to the seventh aspect or the eighth aspect, in a possible implementation, the request information includes at least one of the following: an identifier of the second relay terminal, an identifier of a PC5 interface between the terminal device and the second relay terminal, a link identifier of the third link, or a link quality of the third link.

With reference to the eighth aspect, in a possible implementation, the access network device further includes a processing module.

The transceiver module is further configured to receive sixth indication information sent by a core network device.

The processing module is configured to determine, based on a protocol data unit session established between the terminal device and a core network device, to send service data of a second service in the duplication transmission mode.

The sixth indication information includes at least one of the following: a type identifier of the second service or a quality of service QoS requirement of the second service.

With reference to the seventh aspect or the eighth aspect, in a possible implementation, the transceiver module is further configured to: receive capability information sent by the terminal device, where the capability information indicates at least one of the following:

the terminal device supports communication with the access network device over a relay link;

the terminal device supports first duplication transmission, where at least one link for the first duplication transmission is a relay link;

the terminal device supports second duplication transmission, where the second duplication transmission includes at least two links over which carrier aggregation duplication transmission is performed and at least one relay link;

a maximum quantity of relay links that are used for duplication transmission and that are supported by the terminal device; and a maximum quantity of relay terminals that are used for duplication transmission and that are supported by the terminal device.

With reference to the seventh aspect or the eighth aspect, in a possible implementation, the transceiver module is further configured to: receive second indication information sent by the terminal device, where the second indication information indicates at least one of the following: an identifier of at least one relay terminal that can establish a relay link with the terminal device, an identifier of a PC5 interface of the at least one relay terminal that can establish the relay link with the terminal device, an identifier of a relay link of the at least one relay terminal that can establish the relay link with the terminal device, and a link quality of at least one relay link that can be established with the terminal device.

With reference to the seventh aspect or the eighth aspect, in a possible implementation, the transceiver module is further configured to: send third indication information to the terminal device, where the third indication information indicates an identifier of the first relay terminal that establishes the first relay link with the terminal device, an identifier of a PC5 interface of the first relay link that is established with the terminal device, or an identifier of the first link.

With reference to the seventh aspect or the eighth aspect, in a possible implementation, the transceiver module is further configured to: send fourth indication information to the first relay terminal by the terminal device, where the fourth indication information indicates the first relay terminal to establish the second link with the access network device.

With reference to the seventh aspect or the eighth aspect, in a possible implementation, the transceiver module is further configured to: send configuration information, where the configuration information is for configuring a correspondence between the first link and the second link.

With reference to the seventh aspect or the eighth aspect, in a possible implementation, the transceiver module is further configured to:

send control signaling to the terminal device, where the control signaling is for activating or deactivating at least one link that is for performing duplication transmission; or send control signaling to the first relay terminal.

According to a ninth aspect, a terminal device is provided, including a processor, a memory, an input interface, and an output interface. The input interface is configured to receive information from another communication apparatus other than the terminal device, the output interface is configured to output information to another communication apparatus other than the terminal device, and the processor invokes a computer program stored in the memory to implement the method according to any one of the possible implementations of the first aspect or the second aspect.

In a possible design, the terminal device may be a chip or user equipment that includes apparatuses such as a chip and an antenna that implements the method according to the first aspect or the second aspect.

According to a tenth aspect, an access network device is provided, including a processor, a memory, an input interface, and an output interface. The input interface is configured to receive information from another communication apparatus other than the access network device, the output interface is configured to output information to another communication apparatus other than the access network device, and the processor invokes a computer program stored in the memory to implement the method according to any one of the possible implementations of the third aspect or the fourth aspect.

In a possible design, the access network device may be a chip or a device that includes apparatuses such as a chip and an antenna that implements the method according to the third aspect or the fourth aspect.

According to an eleventh aspect, a computer-readable storage medium is provided. The computer-readable storage medium stores a computer program. When the computer program is run, the method according to any one of the possible implementations of the first aspect or the second aspect is implemented, or the method according to any one of the possible implementations of the third aspect or the fourth aspect is implemented.

BRIEF DESCRIPTION OF DRAWINGS

The following briefly describes the accompanying drawings used in descriptions of embodiments or the conventional technology.

DESCRIPTION OF EMBODIMENTS

Figure 1:
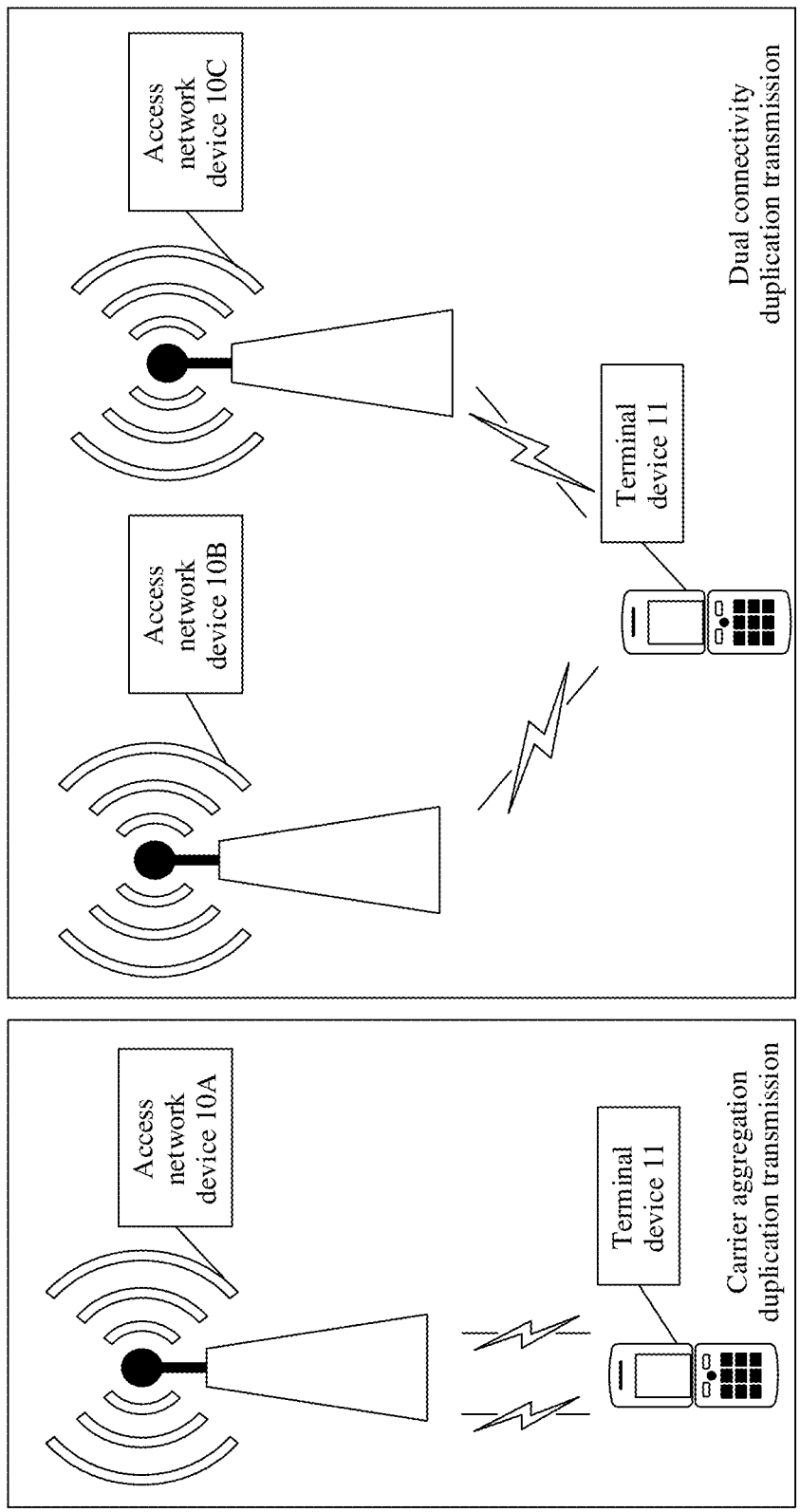
FIG. 1 shows an architecture for improving data transmission reliability according to an embodiment of this application.

The following describes the technical solutions in embodiments of this application with reference to the accompanying drawings in embodiments of this application.

In the specification, claims, and accompanying drawings of this application, the terms "first", "second", and the like are intended to distinguish between different objects but do not indicate a particular order.

First, the technical solutions in embodiments of this application may be applied to a long term evolution (LTE) architecture, a 5th generation mobile communication technology (5G), a wireless local area network (WLAN) system, and the like.

The method provided in embodiments of this application is applicable to but is not limited to the following fields: a device-to-device (D2D) device, a vehicle to everything (V2X) device, unmanned driving, automated driving (ADS), driver assistance (ADAS), intelligent driving, connected driving, intelligent network driving), car sharing, and the like.

Currently, a vehicle obtains road condition information or receives an information service in time through vehicle to vehicle (V2V) communication, vehicle to infrastructure (V2I) communication, vehicle to pedestrian (V2P) communication, or vehicle to network (V2N) communication. These communication manners may be collectively referred to as V2X communication. A typical application scenario of sidelink communication is V2X. In the V2X, each vehicle is a terminal device or a relay terminal. Alternatively, a terminal device or a relay terminal may be another device. This is not limited in this application.

To make embodiments of this application clearer, some concepts or content in embodiments of this application are briefly described herein.

1. Communication Type Supported Over a Sidelink

The communication type includes broadcast communication, multicast communication, and unicast communication. In an LTE system, the broadcast communication is supported over the sidelink. In an NR system, the broadcast communication, the multicast communication, and the unicast communication are supported over the sidelink.

The broadcast communication is similar to broadcasting system information by an access network device. To be specific, a terminal device sends data of a broadcast service to the outside without encryption. Any other terminal device within an effective reception scope may receive the data of the broadcast service if the terminal device is interested in the broadcast service.

The multicast communication refers to communication between all terminals in a communication group, and any terminal device in the group can receive and send data of a multicast service.

The unicast communication is similar to data communication performed after a radio resource control (RRC) connection is established between a terminal device and an access network device, and a unicast connection needs to be first established between the terminal device and a relay terminal. After the unicast connection is established, the terminal device and the relay terminal may perform data communication based on a negotiated identifier. The data may be encrypted or may not be encrypted. Compared with the broadcast communication, the unicast communication can be performed only between a terminal device and a relay terminal that have established a unicast connection with each other.

The methods provided in embodiments of this application may be applied to a unicast communication scenario over a sidelink.

2. Protocol Stack in a UE-to-Network Relay System

From the perspective of a protocol stack, UE-to-Network relay is classified into two types: L3 relay and L2 relay.

In the L3 relay, a relay terminal performs relay based on an internet protocol (IP) layer. There is no peer-to-peer protocol layer between an access network device and a terminal device on a user plane and a control plane. Therefore, the terminal device is invisible to the access network device, and only the relay terminal is visible to the access network device. To be specific, when information sent by the terminal device reaches the access network device, the access network device does not parse the information, and directly forwards the information to a core network device. In this case, it may be considered that the terminal device communicates with the core network device via the relay terminal. Therefore, in the following descriptions of this application, if that "the terminal device communicates with the core network device via the relay terminal" is described, it indicates that the UE-to-Network relay system is an L3 relay system.

In the L2 relay, a relay terminal may perform relay based on a packet data convergence protocol (PDCP) layer or a protocol layer (for example, a backhaul adaptation protocol (BAP) layer (which may also be referred to as an adaptation layer), or a radio link control (RLC) layer) below the PDCP layer. There are a peer-to-peer PDCP layer, a peer-to-peer service data adaptation protocol (SDAP), and the like between an access network device and a terminal device on a user plane. There are a peer-to-peer RRC layer, a peer-to-peer PDCP layer, and the like between the access network device and the terminal device on a control plane. In other words, an RRC connection is established between the terminal device and the access network device, and an RRC message may be exchanged via the relay terminal. In this case, it may be considered that the terminal device communicates with the access network device via the relay terminal. Therefore, in the following descriptions of this application, if that "the terminal device communicates with the access network device via the relay terminal" is described, it indicates that the UE-to-Network relay system is an L2 relay system.

3. Duplication Transmission

In an existing solution, two architectures are proposed for improving data transmission reliability. One is CA duplication transmission, and the other is DC duplication transmission. Specifically, refer to FIG. 1. FIG. 1 shows an architecture for improving data transmission reliability according to an embodiment of this application. As shown in FIG. 1, it can be learned that CA duplication transmission includes: An access network device 10A and a terminal device 11 transmit a same data packet by using different carriers as different paths. DC duplication transmission includes: Two access network devices and the terminal device 11 transmit a same data packet by using different connections as different paths. Specifically, in a DC technology, a data packet may be transmitted between an access network device 10B and the terminal device 11, and a data packet may be transmitted between an access network device 10C and the terminal device 11. In addition, the data packet transmitted between the access network device 10B and the terminal device 11 and the data packet transmitted between the access network device 10C and the terminal device 11 are a same data packet. It may be understood that, in this solution, the CA duplication transmission means that a same data packet is transmitted between a single access network device and a terminal device by using different carriers as different paths, and the DC duplication transmission means that a same data packet is transmitted between two access network devices and a terminal device by using different connections as different paths.

In embodiments of this application, duplication transmission refers to higher layer duplication transmission, and may be PDCP layer duplication transmission or MAC layer duplication transmission. The duplication transmission may be understood as follows. A plurality of transmission paths are established, a data packet is duplicated to obtain a plurality of copies, and each copy is transmitted on a different path, to obtain a diversity transmission gain and improve transmission reliability. The plurality of copies of the data packet that are transmitted on different paths may be simultaneously transmitted or transmitted in a time sequence. This is not limited. When a data packet is transmitted in a time sequence, the data packet may be first transmitted on one path, then a copy of the data packet is stored in a buffer, and then the buffered data packet is transmitted on another path. In addition, the duplication transmission in embodiments of this application mainly refers to duplication transmission over a relay link. To be specific, in a plurality of links over which the duplication transmission is performed, at least one link is a relay link.

Further, with reference to FIG. 1, because a CA duplication transmission technology is easily affected by an obstruction, in some complex environments, the CA duplication transmission technology cannot meet a reliability requirement of service transmission. Specifically, when there is an obstruction between a base station and user equipment, even if there are a plurality of carriers between the base station and the user equipment, there is a high probability that no carrier can operate. Therefore, communication reliability cannot be ensured. In addition, in the DC duplication transmission technology, because locations of two base stations communicating with user equipment are different, a problem caused by an obstruction may be resolved to some extent. However, it is difficult to deploy the DC in a plurality of scenarios due to deployment costs or environment limitations. Therefore, using the DC duplication transmission technology to resolve the problem caused by an obstruction also has some limitations. In this case, a problem of how to improve data transmission reliability when there is an obstruction needs to be resolved urgently.

Based on this, embodiments of this application provide a communication method to resolve the foregoing problem. The following describes embodiments of this application in detail.

Figure 2:
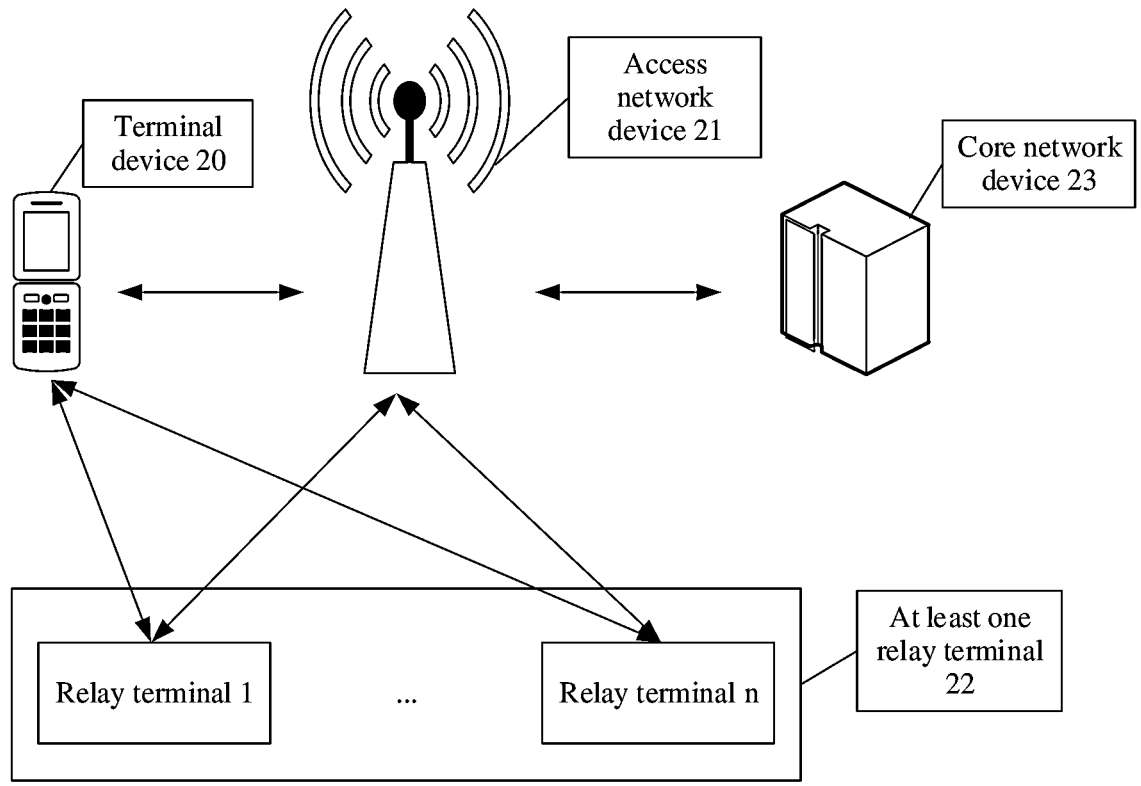
FIG. 2 shows a basic architecture of a communication system according to an embodiment of this application.

FIG. 2 shows a basic architecture of a communication system according to an embodiment of this application. As shown in FIG. 2, the communication system may include a terminal device 20, an access network device 21, at least one relay terminal 22, and a core network device 23. The terminal device 20 may communicate with the relay terminal 22. The access network device 21 may separately communicate with the terminal device 20, the relay terminal 22, and the core network device 23. The at least one relay terminal 22 may include relay terminal 1 to relay terminal n, where n may be an integer greater than 0.

The relay terminal 22 and the terminal device 20 are two independent devices in a service area covered by the access network device 21 or an antenna of the access network device 21. Alternatively, the relay terminal 22 and the terminal device 20 are two independent devices in a cell or beam coverage of the access network device 21. Further, the terminal device 20 or the relay terminal 22 may be a chip, or may be user equipment including a chip. Further, the terminal device 20 or the relay terminal 22 is a user-side entity configured to receive a signal, or send a signal, or receive a signal and send a signal. The terminal device 20 or the relay terminal 22 is configured to provide a user with one or more of a voice service or a data connectivity service. It may be understood that when the terminal device 20 or the relay terminal 22 is the chip, the chip may include a processor and an interface. When the terminal device 20 or the relay terminal 22 is the user equipment including the chip, the terminal device 20 or the relay terminal 22 may be a device that includes a wireless transceiver function and that can cooperate with an access network device to provide a communication service for a user. Specifically, the terminal device 20 or the relay terminal 22 may be user equipment (UE), an access terminal, a subscriber unit, a subscriber station, a mobile station, a remote station, a remote terminal, a mobile device, a terminal, a wireless communication device, a user agent, or a user apparatus. Alternatively, the terminal device 20 or the relay terminal 22 may be a vehicle to everything (V2X) device, for example, a smart car (or intelligent car), a digital car, an unmanned car (driverless car, pilotless car, or automobile), a self-driving car (or autonomous car), a pure electric vehicle (pure EV or Battery EV), a hybrid electric vehicle (HEV), a range extended electric vehicle (REEV), a plug-in hybrid electric vehicle (PHEV), or a new energy vehicle. Alternatively, the terminal device 20 or the relay terminal 22 may be a device to device (D2D) device, for example, an electricity meter or a water meter. Alternatively, the terminal device 20 or the relay terminal 22 may be an unmanned aerial vehicle, an internet of things (IoT) device, a station (ST) in a WLAN, a cellular phone, a smart phone, a cordless phone, a wireless data card, a tablet computer, a session initiation protocol (SIP) phone, a wireless local loop (WLL) station, a personal digital assistant (PDA) device, a laptop computer, a machine type communication (MTC) terminal, a handheld device having a wireless communication function, a computing device, another processing device connected to a wireless modem, a vehicle-mounted device, or a wearable device (which may also be referred to as a wearable intelligent device). Alternatively, the terminal device 20 or the relay terminal 22 may be a terminal in a 5G system, or may be a terminal in a next-generation communication system. This is not limited in this embodiment of this application.

The access network device 21 may be a chip configured to communicate with the terminal device 20, the relay terminal 22, and the core network device 23, or may be a device that includes a chip and that is configured to communicate with the terminal device 20, the relay terminal 22, and the core network device 23. The access network device 21 is a network-side entity configured to send a signal, or receive a signal, or send a signal and receive a signal. It may be understood that when the access network device 21 is the chip, the chip may include a processor and an interface. When the access network device 21 is the device including the chip, the access network device 21 may be an apparatus that is deployed in a radio access network (RAN) and that provides a wireless communication function for the terminal device 20 and the relay terminal 22, for example, may be a transmission reception point (TRP), a base station, or a control node in various forms. The control node in various forms is, for example, a network controller, a radio controller, or a radio controller in a cloud radio access network (CRAN) scenario. Specifically, the access network device may be a macro base station, a micro base station (which is also referred to as a small cell), a relay station, an access point (AP), or the like in various forms, or may be an antenna panel of a base station. The control node may be connected to a plurality of base stations, and configure resources for a plurality of terminals covered by the plurality of base stations. In systems using different radio access technologies, names of devices having functions of a base station may be different. For example, the base station may be an evolved NodeB (eNB or eNodeB) in an LTE system, or may be the radio controller in the cloud radio access network (cloud radio access network, CRAN) scenario, or may be a (gNB) in 5G. Alternatively, the access network device 21 may be a relay station, an access point, a vehicle-mounted device, a wearable device, a network-side device in a network that is after 5G, or a network device in a future evolved PLMN network. A specific name of the base station is not limited in this application.

The core network device 23 corresponds to different devices in different communication systems. For example, the core network device 23 corresponds to a serving GPRS support node (SGSN) and/or a gateway GPRS support node (GGSN) in a 3G system, corresponds to an MME or an S-GW in a 4G system, and corresponds to an access and mobility management function (AMF), a session management function (SMF), or a mobility management entity (UPF) in a 5G system.

Further, for example, the access network device 21 and the terminal device 20 may be considered as a communication system. In the communication system, the access network device 21 may send downlink data to the terminal device 20. Certainly, the terminal device 20 may send uplink data to the access network device 21. In addition, the access network device 21, the terminal device 20, and relay terminal 1 may alternatively be considered as a communication system. In the communication system, the access network device 21 may send downlink data to relay terminal 1, and then relay terminal 1 sends the downlink data to the terminal device 20. Certainly, the terminal device 20 may send uplink data to relay terminal 1, and then relay terminal 1 sends the uplink data to the access network device 21.

Figure 3:
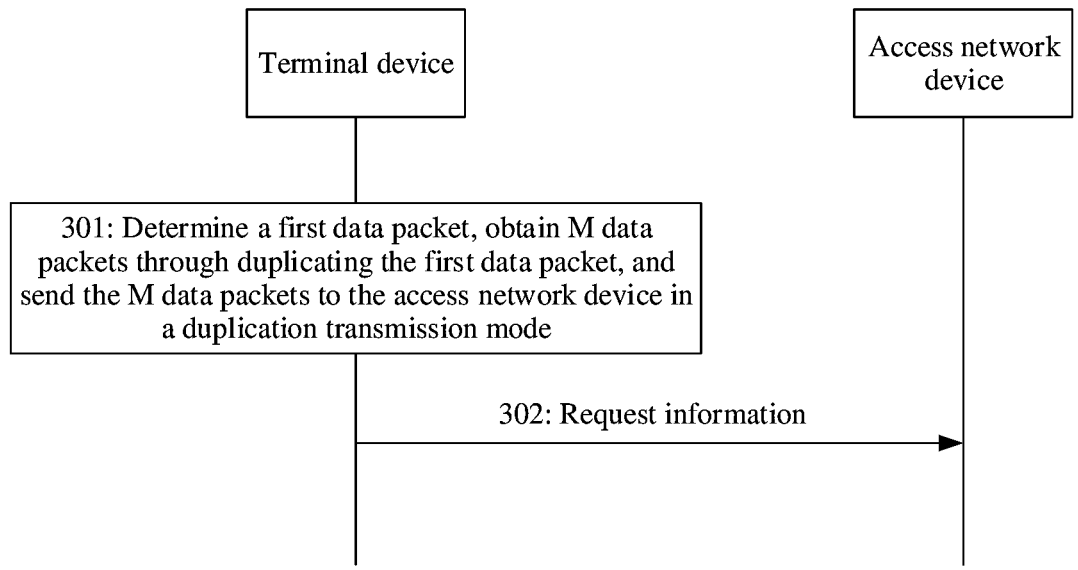
FIG. 3 is a schematic diagram of a communication method according to an embodiment of this application.

The following describes a process of transmitting uplink data between a terminal device and an access network device. Specifically, refer to FIG. 3. FIG. 3 is a schematic diagram of a communication method according to an embodiment of this application. With reference to FIG. 2, a terminal device in FIG. 3 is the terminal device 20 in FIG. 2, an access network device in FIG. 3 is the access network device 21 in FIG. 2, a first relay terminal in FIG. 3 may be the relay terminal 22 in FIG. 2, a second relay terminal in FIG. 3 may be the relay terminal 22 in FIG. 2, and a core network device in FIG. 3 may be the core network device 23 in FIG. 2. As shown in FIG. 3, the method includes but is not limited to the following steps.

301: The terminal device determines a first data packet, obtains M data packets through duplicating the first data packet, and sends the M data packets to the access network device in a duplication transmission mode, where M is an integer greater than 1.

The first data packet may be a packet data convergence protocol (PDCP) layer data packet, a radio link control (RLC) layer data packet, a media access control (MAC) layer data packet, or a transmission control protocol/internet protocol (TCP/IP) data packet. It may be understood that when the first data packet is the PDCP layer data packet, the terminal device may duplicate the first data packet at a PDCP layer of the terminal device. When the first data packet is the RLC layer data packet, the terminal device may duplicate the first data packet at an RLC layer of the terminal device. When the first data packet is the MAC layer data packet, the terminal device may duplicate the first data packet at a MAC layer of the terminal device. When the first data packet is the TCP/IP data packet, the terminal device may duplicate the first data packet at a transport layer of the terminal device.

That the terminal device sends the M data packets to the access network device in a duplication transmission mode includes: The terminal device sends N data packets in the M data packets to the access network device through an air interface, where N is an integer greater than 0 and less than M. The terminal device sends M-N data packets in the M data packets to the access network device over a first relay link, where the first relay link includes a first link and a second link, the first link is a link between the terminal device and a first relay terminal, and the second link is a link between the first relay terminal and the access network device.

The air interface is a name, and the air interface may be a communication interface between the access network device and the terminal device. For example, in 5G, an air interface is referred to as new radio (NR).

That the terminal device sends N data packets in the M data packets to the access network device through an air interface includes: The terminal device sends the N data packets to the access network device over P links on the air interface. Further, the P links correspond to P carriers. To be specific, the terminal device sends the N data packets to the access network device on the P carriers. P may be N, or may be an integer greater than N. This is not limited herein.

The link between the terminal device and the first relay terminal may be connected through a PC5 interface, and may also be referred to as a sidelink (SL). In addition, an interface between the first relay terminal and the access network device may be referred to as an air interface. In this application, the air interface, the PC5 interface, and the sidelink are all names or codes, and may change in different communication systems. However, functions of the air interface, the PC5 interface, and the sidelink are similar. Therefore, these names are used as examples for description in the present invention, and the names are not limited.

It should be noted that the terminal device may establish another link other than the first link with the first relay terminal. In addition, the first relay terminal may be at least one first relay terminal, and the first relay link may be at least one first relay link. To be specific, the terminal device may establish a plurality of first links with a same relay terminal to perform duplication transmission, or may establish a plurality of first links with different relay terminals to perform duplication transmission. This is not limited herein.

It may be understood that the terminal device may communicate with the access network device over a plurality of links, and the plurality of links may include at least one relay link.

Figure 4:
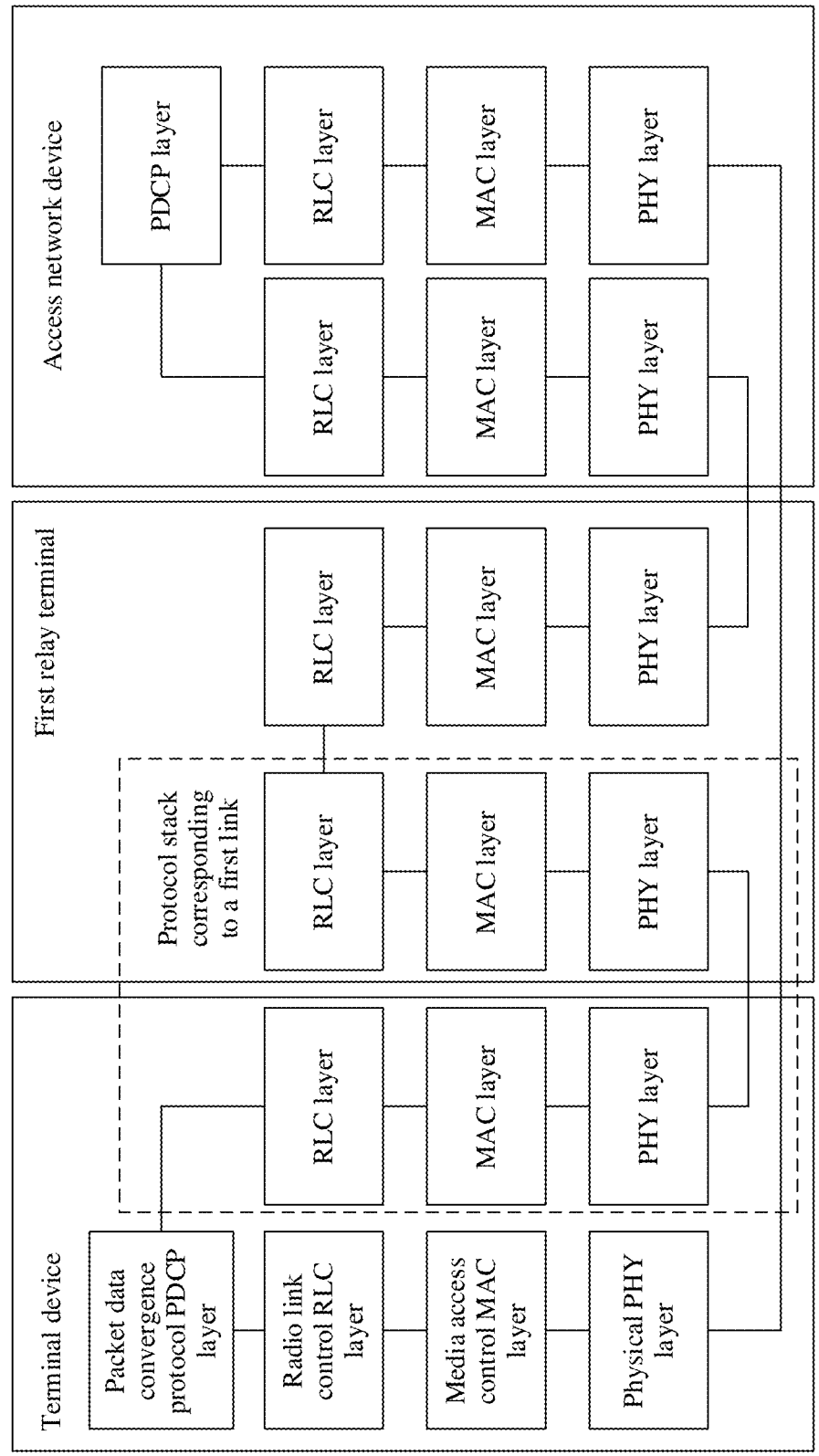
FIG. 4 is a schematic diagram of data packet transmission according to an embodiment of this application.

When the first data packet is the PDCP layer data packet, the M data packets are M PDCP layer data packets. Further, the terminal device may send the M PDCP layer data packets to the access network device in the duplication transmission mode. Specifically, refer to FIG. 4. FIG. 4 is a schematic diagram of data packet transmission according to an embodiment of this application. As shown in FIG. 4, for the terminal device, a protocol stack related to the terminal device includes a PDCP layer, a radio link control (RLC) protocol layer, a MAC layer, and a physical (PHY) layer. In addition, the protocol stack corresponding to the terminal device may further include another layer above the PDCP layer. This is not limited herein. For example, in LTE, the protocol stack corresponding to the terminal device may further include a transport layer and an application layer. In 5G, the protocol stack corresponding to the terminal device may further include a service data adaptation protocol (SDAP) layer, a transport layer, and an application layer.

For the first relay terminal, a protocol stack related to the first relay terminal may include an RLC layer, a MAC layer, and a PHY layer.

For the access network device, a protocol stack related to the access network device includes a PDCP layer, an RLC layer, a MAC layer, and a PHY layer. In addition, the protocol stack corresponding to the access network device may further include another layer above the PDCP layer. This is not limited herein. For example, in LTE, the protocol stack corresponding to the access network device may further include a transport layer and an application layer. In 5G, the protocol stack corresponding to the access network device may further include a service data adaptation protocol (SDAP) layer, a transport layer, and an application layer.

Further, the terminal device may separately process N PDCP layer data packets in the M PDCP layer data packets at the RLC layer, the MAC layer, and the PHY layer of the terminal device, to obtain N PHY layer data packets, and send the N PHY layer data packets to the access network device through the air interface.

In addition, the terminal device may further forward M-N PDCP layer data packets in the M PDCP layer data packets to the access network device via the first relay terminal. Specifically, the terminal device may send the M-N PDCP layer data packets to the first relay terminal over the first link. Further, a protocol stack corresponding to the first link may include an RLC layer, a MAC layer, and a PHY layer. Alternatively, a protocol stack corresponding to the first link may be a transport layer protocol stack. Specifically, the transport layer protocol stack may include a general packet radio service (GPRS) tunneling protocol (GPRS tunneling protocol) layer, a TCP/IP layer, a user datagram protocol (UDP) layer, and the like.

Further, with reference to FIG. 4, when the first data packet is the PDCP layer data packet, the protocol stack corresponding to the first link includes the RLC layer, the MAC layer, and the PHY layer. In this case, the terminal device may process the M-N PDCP layer data packets by using the protocol stack corresponding to the first link, to obtain M-N PHY layer data packets corresponding to the first link. When receiving the M-N PHY layer data packets, the first relay terminal may process, by using the protocol stack corresponding to the first link, the M-N PHY layer data packets corresponding to the first link, to obtain M-N RLC layer data packets. Further, the first relay terminal may process the M-N RLC layer data packets at the MAC layer and the PHY layer of the first relay terminal, to obtain M-N PHY layer data packets corresponding to the first relay terminal. Then, the first relay terminal sends, to the access network device over the second link, the M-N PHY layer data packets corresponding to the first relay terminal.

Further, the access network device may receive the N PHY layer data packets and the M-N PHY layer data packets that correspond to the first relay terminal. With reference to FIG. 4, the access network device may process the N PHY layer data packets at the PHY layer, the MAC layer, and the RLC layer of the access network device, to obtain N RLC layer data packets corresponding to the access network device. The access network device may also process, at the PHY layer, the MAC layer, and the RLC layer of the access network device, the M-N PHY layer data packets corresponding to the first relay terminal, to obtain M-N RLC layer data packets corresponding to the access network device. Further, the access network device may perform, at the PDCP layer of the access network device, sorting and/or deduplication on the N RLC layer data packets corresponding to the access network device and the M-N RLC layer data packets corresponding to the access network device, and then further deliver the data packets to an upper layer of the PDCP layer of the access network device.

302: The access network device receives request information sent by the terminal device.

The request information is for requesting to update the first relay link to a second relay link, the second relay link includes a third link and a fourth link, the third link is a link between the terminal device and the second relay terminal, and the fourth link is a link between the second relay terminal and the access network device.

When a link quality of the first link is less than or equal to a first preset threshold, the terminal device may send the request information to the access network device. The first preset quality threshold may be predetermined in a protocol, or may be carried in configuration information sent by the access network device to the terminal device. It may be understood that in this application, a link quality may be a reference signal received power (RSRP), a reference signal received quality (RSRQ), or the like. In addition, the request information may be further for requesting to update the first relay terminal to the second relay terminal.

The link between the terminal device and the second relay terminal may be connected through a PC5 interface, and may also be referred to as a sidelink. An interface between the second relay terminal and the access network device may be an air interface.

It should be noted that the terminal device may establish another link other than the third link with the second relay terminal. In addition, the second relay terminal may be at least one relay terminal, and the second relay link may be at least one relay link. Further, the second relay terminal is a device different from the first relay terminal, and the second relay terminal, the first relay terminal, and the terminal device are all in a service area covered by the access network device or an antenna of the access network device; or the second relay terminal, the first relay terminal, and the terminal device are all in a cell or beam coverage of the access network device.

In addition, the request information includes at least one of the following: an identifier of the second relay terminal, an identifier of a PC5 interface between the terminal device and the second relay terminal, a link identifier of the third link, or a link quality of the third link.

In addition, the access network device may measure a quality of a link between the terminal device and the access network device. When the quality of the link between the terminal device and the access network device is greater than or less than a third preset quality threshold, the access network device may update the first relay link to the second relay link, or may update the first relay terminal to the second relay terminal. The access network device may alternatively measure a link quality of the second link. When the link quality of the second link is greater than or less than a second preset quality threshold, the access network device may update the first relay link to the second relay link, or may update the first relay terminal to the second relay terminal. Certainly, the first relay terminal may alternatively measure the link quality of the first link. When the link quality of the first link is greater than or less than the first preset quality threshold, the first relay terminal may send the request information to the access network device. It may be understood that the first relay terminal may alternatively measure the link quality of the second link. When the link quality of the second link is greater than or less than the second preset quality threshold, the first relay terminal may send the request information to the access network device. Further, the access network device may send a release message to the first relay terminal; and send, to the second relay terminal, a message for establishing the fourth link. The third preset quality threshold may be predetermined in a protocol, or may be carried in configuration information sent by the access network device to the terminal device. The second preset quality threshold and the third preset quality threshold may be predetermined in a protocol, or may be determined by the access network device.

It may be understood that the second preset quality threshold may alternatively be carried in configuration information sent by the access network device to the terminal device.

It can be learned that in the foregoing technical solution, a data packet is duplicated, where at least one data packet obtained through duplication is transmitted through the air interface, and at least one data packet obtained through duplication is transmitted over the first relay link. In this way, a same data packet is duplicated and transmitted on different paths, so that a problem of unreliable data transmission caused by an obstruction occurs less frequently. In addition, when a quality of an existing relay link is poor, dynamic update of the relay link avoids a problem that duplication transmission over a relay link cannot be performed due to a poor link quality when there is an obstruction, and also avoids a problem that data transmission is unreliable when the duplication transmission over the relay link cannot be performed.

In a possible implementation, the first data packet belongs to a first service. The method further includes: The terminal device sends first indication information to the access network device.

The first indication information includes at least one of the following: a type identifier of the first service, a quality of service (QoS) requirement of the first service, a type of the terminal device, location information of the terminal device, or the link quality of the first link.

It may be understood that the access network device may receive the first indication information. Further, the access network device may determine, based on the first indication information, that the first service needs to be transmitted in a duplication transmission mode over a relay link. It may be understood that when the terminal device is located in an area in which the terminal device is easily obstructed, the access network device may determine, based on the location information of the terminal device, that the first service needs to be transmitted in the duplication transmission mode over the relay link. In addition, the access network device may alternatively determine, based on preset content and the first indication information, that the first service needs to be transmitted in the duplication transmission mode over the relay link. The preset content may specify at least one of the following: a preset device type, a type identifier of a preset service, a QoS requirement of the preset service, and a preset quality of a link between the terminal device and a relay terminal. When the preset content meets a specific condition, the access network device may determine that the first service needs to be transmitted in the duplication transmission mode over the relay link.

The preset device type is a type of a device having a high requirement on data transmission reliability. For example, a device of the preset device type may be, for example, a device in an industrial park, or may be a device that performs high-frequency transmission. The type identifier of the preset service is a type identifier of a service having the high requirement on the data transmission reliability. For example, the preset service may be, for example, a service that needs to be transmitted in a scenario in which obstruction is prone to occur.

It can be learned that in the foregoing technical solution, the terminal device sends indication information to the access network device, so that the access network device can determine, based on the indication information, that service data corresponding to a service needs to be transmitted in a corresponding transmission mode. For example, data transmission needs to be performed in the duplication transmission mode through an air interface and over a relay link.

In a possible implementation, the method further includes:

The terminal device sends capability information to the access network device, where the capability information indicates at least one of the following capabilities:
 the terminal device supports communication with the access network device over a relay link;
 the terminal device supports first duplication transmission, where at least one link for the first duplication transmission is a relay link;
 the terminal device supports second duplication transmission, where the second duplication transmission includes at least two links over which carrier aggregation duplication transmission is performed and at least one relay link;
 a maximum quantity of relay links that are used for duplication transmission and that are supported by the terminal device; and
 a maximum quantity of relay terminals that are used for duplication transmission and that are supported by the terminal device.

The first duplication transmission refers to duplication transmission including the duplication transmission mode over the relay link. The second duplication transmission refers to duplication transmission including a CA duplication transmission mode and the duplication transmission mode over the relay link. If the terminal device reports only the supported maximum quantity of relay links that are used for the duplication transmission, it indicates that a maximum quantity of relay terminals is not limited in a terminal capability. For example, if the maximum quantity of relay links is 4, it indicates that one to four relay terminals may be used during implementation. If the terminal device reports only the supported maximum quantity of relay terminals that are used for the duplication transmission, it indicates that a maximum quantity of relay links is not limited in a terminal capability. For example, if the maximum quantity of relay terminals is 4, it indicates that transmission can be performed by using a maximum of four relay terminals, but a maximum quantity of relay links of each relay terminal is not limited. In addition, both the maximum quantity of relay links and the maximum quantity of relay terminals may be reported, or a maximum quantity of relay links that are on each relay terminal and that are used for duplication transmission may be reported, so that both the supported maximum quantity of relay terminals and the maximum quantity of relay links are limited.

In addition, before the terminal device sends the capability information to the access network device, the terminal device may receive a message that is sent by the access network device and that is for requesting the capability information.

It should be noted that a relay link may be at least one relay link corresponding to one relay terminal, or may be at least two relay links corresponding to different relay terminals. Further, the relay link includes a link between the terminal device and a relay terminal, and a link between the relay terminal and the access network device.

In addition, the access network device may receive the capability information, to determine, based on the capability information, a communication mode that can be supported by the terminal device.

It can be learned that in the foregoing technical solution, the terminal device reports the capability information, so that the access network device can determine, based on a capability of the terminal device, a transmission mode supported by the terminal device, and further determine a transmission mode to be used for communicating with the terminal device.

In a possible implementation, the method further includes: The terminal device sends second indication information to the access network device, where the second indication information indicates at least one of the following: an identifier of at least one relay terminal that can establish a relay link with the terminal device, an identifier of a PC5 interface of the at least one relay terminal that can establish the relay link with the terminal device, an identifier of a relay link of the at least one relay terminal that can establish the relay link with the terminal device, and a link quality of at least one relay link that can be established with the terminal device.

The at least one relay terminal may include the first relay terminal, or may not include the first relay terminal. When the at least one relay terminal does not include the first relay terminal, the terminal device may determine an identifier of the first relay terminal, an identifier of a PC5 interface of the first relay terminal, an identifier of a relay link of the first relay terminal, or a link quality of the first relay link.

It can be learned that in the foregoing technical solution, the terminal device reports, to the access network device, a candidate relay terminal that meets a condition, so that the access network device can select, based on indication information reported by the terminal device, an appropriate relay terminal for the terminal device to perform duplication transmission.

In a possible implementation, the method further includes:

The terminal device receives third indication information sent by the access network device, where the third indication information indicates an identifier of the first relay terminal that establishes the first relay link with the terminal device, an identifier of a PC5 interface of the first relay link that is established with the terminal device, or an identifier of the first link.

It may be understood that the access network device may not be limited to selecting the relay terminal in the second indication information when selecting a relay terminal, and may select at least one terminal device other than the terminal device as the first relay terminal in the service area covered by the access network device or the antenna of the access network device, in the cell of the access network device, or in the beam coverage of the access network device.

It can be learned that in the foregoing technical solution, the access network device sends related information of a selected relay terminal or relay link to the terminal device, so that the terminal device can learn of a specific relay terminal or relay link that is for performing duplication transmission.

In a possible implementation, the method further includes: The terminal device sends fourth indication information to the first relay terminal, where the fourth indication information indicates the first relay terminal to establish the second link with the access network device.

It may be understood that the first relay terminal is in idle mode or inactive mode. To be specific, the terminal device sends the fourth indication information to the first relay terminal that is in idle mode or inactive mode. Further, the second link is an RRC connection.

It should be noted that the access network device may send the fourth indication information to the terminal device, and then the terminal device sends the fourth indication information to the first relay terminal that is in idle mode or inactive mode. Alternatively, the access network device may send a paging message to the first relay terminal that is in idle mode or inactive mode. Alternatively, the access network device may send indication information to the core network device, and the core network device sends, based on the indication information, a paging message to the first relay terminal that is in idle mode.

It can be learned that in the foregoing technical solution, indication information is sent to a relay terminal, so that the relay terminal can establish the second link with the access network device based on the indication information.

In a possible implementation, the method further includes: The terminal device and/or the first relay terminal receives configuration information, where the configuration information is for configuring a correspondence between the first link and the second link or an association relationship between a PDCP entity located on the terminal device and an RLC entity located on the first relay terminal.

It should be noted that the terminal device may receive, through an air interface, the configuration information sent by the access network device; or may receive, over the first relay link, the configuration information sent by the access network device. In other words, the configuration information is first sent to a relay terminal, and then the relay terminal forwards the configuration information to the terminal device. This is not limited herein.

The configuration information may be for configuring the first link. The configuration information includes at least one of the following: an identifier of the second link, an RLC identifier of the first relay terminal, a logical channel identifier, an identifier of the terminal device, the identifier of the first relay terminal, a PDCP entity identifier of the terminal device, or a radio bearer identifier corresponding to the second link. The configuration information may be further for configuring a mapping relationship. The mapping relationship includes the identifier of the first link and the identifier of the second link; or the identifier of the first relay terminal and the identifier of the second link; or the identifier of the PC5 interface of the first relay terminal and the identifier of the second link, and is for representing that there is the mapping relationship between identifiers of two links.

Further, the configuration information may further include at least one of the following: first radio bearer configuration information, configuration information of a PDCP entity, configuration information of an RLC entity located on the terminal device, and configuration information of the RLC entity located on the first relay terminal. The first radio bearer configuration information may include the configuration information of the PDCP entity, the configuration information of the RLC entity located on the terminal device, the radio bearer identifier corresponding to the second link, a radio bearer type corresponding to the second link, and the like. The configuration information of the PDCP entity may include a PDCP sequence number, an encryption parameter, a header compression parameter, and the like. The configuration information of the RLC entity located on the terminal device or the configuration information of the RLC entity located on the first relay terminal may include a radio bearer identifier, a logical channel number, an RLC sequence number, an RLC mode, and the like. The RLC mode may be an acknowledge mode (AM), an unacknowledge mode (UM), or a transparent mode (TM). The radio bearer type corresponding to the second link is a type of a radio bearer that corresponds to the second link and that is for performing duplication transmission. Further, the radio bearer type corresponding to the second link is for indicating that a PDCP entity corresponding to the radio bearer is located on the terminal device, and an RLC entity corresponding to the radio bearer is located on the first relay terminal.

In another possible implementation, the configuration information may alternatively be for configuring the second link, where the configuration information may be second radio bearer configuration information. The second radio bearer configuration information may include a radio bearer identifier corresponding to the second link or a radio bearer type corresponding to the second link. Further, the second radio bearer configuration information may further include a PC5 interface identifier or a first link identifier. The PC5 interface identifier or the first link identifier may be for indicating a specific first link to which a corresponding RLC entity corresponds. Further, a correspondence between the first link and the PDCP entity on the terminal device has been established by using other configuration information. Therefore, a correspondence between a corresponding PDCP entity and an RLC is also established.

The first relay terminal may receive, through an air interface, the configuration information sent by the access network device; or may receive, via the terminal device, the configuration information sent by the access network device. In other words, the configuration information is first sent to the terminal device, and then the terminal device forwards the configuration information to a relay terminal. This is not limited herein. Further, the access network device may send configuration information of the RLC entity located on the first relay terminal to the terminal device, and then the terminal device sends the configuration information of the RLC entity located on the first relay terminal to the first relay terminal that is in idle mode or inactive mode. Alternatively, the access network device may send the fourth indication information to the terminal device, and then the terminal device sends the fourth indication information to the first relay terminal that is in idle mode or inactive mode. After the first relay terminal enters connected mode from idle mode or inactive mode, the access network device may alternatively send configuration information of the RLC entity located on the first relay terminal to the first relay terminal that is in connected mode.

Idle mode, inactive mode, and connected mode are all for describing a status of the first relay terminal. For the first relay terminal that is in idle mode, a user plane bearer and a control plane bearer that are of an air interface, and a user plane bearer between a RAN and a CN have been released. When initiating a call or a service request, the first relay terminal needs to first establish the control plane bearer of the air interface, then establish the user plane bearer between the RAN and the CN, and configure the user plane bearer of the air interface when establishing the user plane bearer between the RAN and the CN. For the first relay terminal that is in inactive mode, the user plane bearer of the air interface has been suspended, and the user plane bearer and a control plane bearer between the RAN and the CN are still maintained. When initiating a call or a service request, the first relay terminal needs to activate the user plane bearer of the air interface, and reuse the existing user plane bearer and control plane bearer between the RAN and the CN. For the first relay terminal that is in connected mode, the control plane bearer of the air interface has been established, and a default user plane bearer (including the user plane bearer of the air interface and the user plane bearer between the RAN and the CN) has been established. If the default user plane bearer cannot meet a QoS requirement of a service, a dedicated user plane bearer (including the user plane bearer of the air interface and the user plane bearer between the RAN and the CN) is established.

The terminal device may send the M data packets to the access network device in the duplication transmission mode based on the configuration information.

It should be noted that the configuration information may further include seventh indication information, where the seventh indication information indicates initial statuses of the first relay link and another link that are for performing duplication transmission.

It may be understood that the seventh indication information may indicate that initial statuses of a part of links are active mode and initial statuses of other links are inactive mode, or may indicate that initial statuses of all links are active mode, or may indicate that initial statuses of all links are inactive mode.

Further, when a link is in active mode, the terminal device may perform duplication transmission with the access network device over the link. For example, if the first relay link is in active mode, the PDCP entity of the terminal device may send a data packet to the RLC entity of the first relay terminal; or if the first relay link is in inactive mode, the PDCP entity of the terminal device does not send a data packet to the RLC entity of the first relay terminal.

For example, if the first relay link is in inactive mode, and a link on the air interface between the access network device and the terminal device is in active mode, the terminal device may communicate with the access network device over the link on the air interface; or if the first relay link is in active mode, and a link on the air interface between the access network device and the terminal device is in inactive mode, the terminal device may communicate with the access network device over the first relay link.

It can be learned that in the foregoing technical solution, the terminal device may learn of a correspondence between links based on the configuration information, to complete duplication transmission over a relay link in a subsequent process.

In a possible implementation, the method further includes: The terminal device receives control signaling sent by the access network device, where the control signaling is for activating or deactivating at least one link that is for performing duplication transmission. Alternatively, the terminal device receives fifth indication information sent by the first relay terminal, where the fifth indication information is for activating or deactivating at least one link that is for performing duplication transmission.

The control signaling or the fifth indication information may include a PDCP control protocol data unit (PDU), an RLC control PDU, a MAC control element (CE), RRC signaling, or downlink control information (DCI).

Specifically, the access network device may send the control signaling to the terminal device through the air interface, or the access network device may send the control signaling to the terminal device over the first relay link. For example, if the quality of the link between the terminal device and the access network device is greater than a fourth preset quality threshold, the access network device may send the control signaling to the terminal device through the air interface; or if the quality of the link between the terminal device and the access network device is less than a fourth preset quality threshold, the access network device may send the control signaling to the terminal device over the first relay link. In addition, the access network device may alternatively send the control signaling to the first relay terminal. Then, the first relay terminal sends the fifth indication information to the terminal device based on the control signaling, where the fifth indication information may be the foregoing control signaling or interface signaling between the first relay terminal and the terminal device.

The fourth preset quality threshold may be preset in a protocol, or may be determined by the access network device. The access network device determines, based on a result of comparison between a downlink quality reported by the terminal and the fourth preset quality threshold, to send the control signaling to the terminal device through the air interface or send the control signaling to the terminal device over the first relay link.

Further, the terminal device may further implement switching between different transmission modes based on the control signaling or the fifth indication information. It may be understood that in this application, the transmission mode includes CA duplication transmission, duplication transmission including one relay terminal, duplication transmission including a plurality of relay terminals, and duplication transmission including both a relay terminal and the CA duplication transmission. The CA duplication transmission means that the terminal device and the access network device perform duplication transmission over at least two links of the air interface. The duplication transmission including one relay terminal means that at least one link over which the duplication transmission is performed is a relay link, and the duplication transmission involves only one relay terminal. The duplication transmission including a plurality of relay terminals means that at least one link over which the duplication transmission is performed is a relay link, and the duplication transmission involves the plurality of relay terminals, where at least one relay link may be distributed on the plurality of relay terminals. The duplication transmission including both a relay terminal and the CA duplication transmission means that at least two links over which the duplication transmission is performed are transmitted through an air interface, and at least one other link is a relay link.

It may be understood that the control signaling or the fifth indication information may indicate that a part of links over which duplication transmission is performed are in active mode and other links are in inactive mode, or may indicate that all links over which duplication transmission is performed are in active mode, or may indicate that all links over which duplication transmission is performed are in inactive mode.

Figure 5:
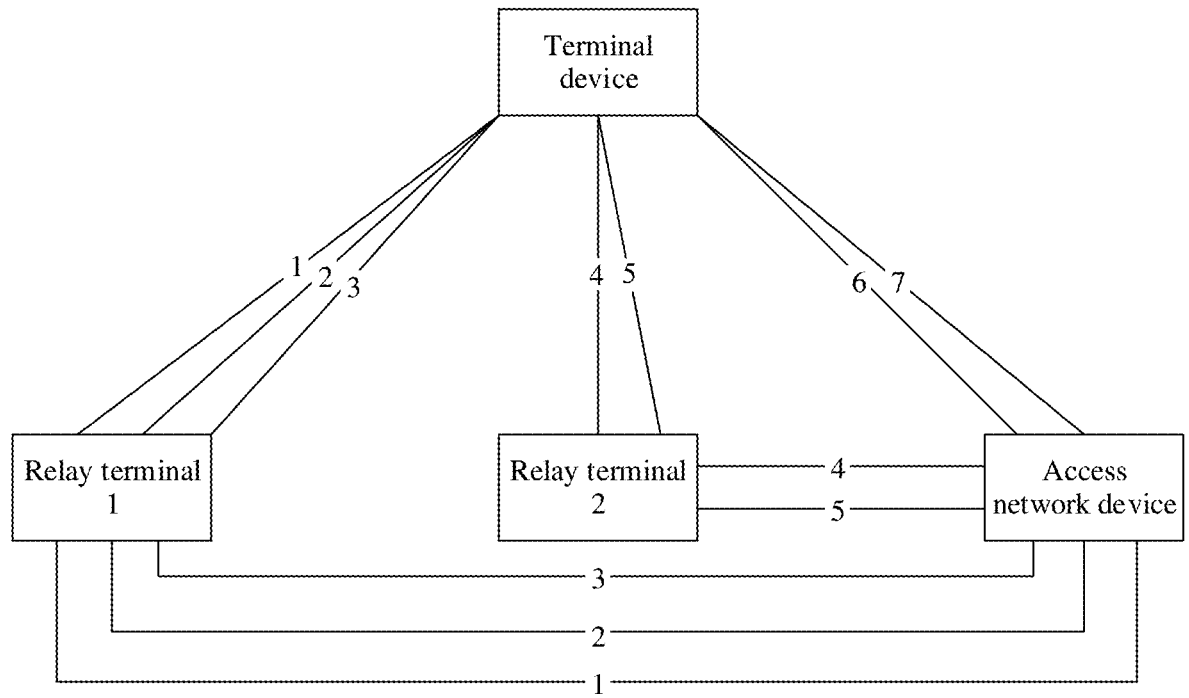
FIG. 5 is a schematic diagram of activating or deactivating at least one link that is for performing duplication transmission according to an embodiment of this application.

For example, there are three relay links between the terminal device and relay terminal 1, there are two relay links between the terminal device and relay terminal 2, and there are two links between the terminal device and the access network device. Specifically, refer to FIG. 5. FIG. 5 is a schematic diagram of activating or deactivating at least one link that is for performing duplication transmission according to an embodiment of this application. It is assumed that the three relay links on relay terminal 1 are all in active mode, relay link 4 on relay terminal 2 is in deactivated mode, and relay link 5 on relay terminal 2 is in active mode; and in the links between the terminal device and the access network device, link 6 is in deactivated mode, and link 7 is in active mode. It is assumed that the control signaling or the fifth indication information is for activating relay link 4 and deactivating the three relay links on relay terminal 1. In this case, when the terminal device receives the control signaling or the fifth indication information, the terminal device may activate relay link 4 and deactivate the three relay links on relay terminal 1.

It can be learned that in the foregoing technical solution, the access network device may send signaling to control whether each link, including a relay link and a non-relay link, for performing duplication transmission is in active mode or deactivated mode.

In a possible implementation, the method further includes: When a first preset condition is met, the terminal device activates at least one link that is for performing duplication transmission.

The first preset condition includes at least one of the following: the link quality of the first link is less than or equal to the first preset quality threshold; or the link quality of the second link is less than or equal to the second preset quality threshold; or a bit error rate of transmission of the first data packet is greater than or equal to a preset bit error rate threshold; or a quantity of repetitions of the first data packet is greater than or equal to a preset quantity of repetitions.

The second preset quality threshold may be preset in a protocol, or may be carried in the configuration information sent by the access network device to the terminal device.

In addition, when a second preset condition is met, the terminal device may deactivate at least one link that is for performing duplication transmission. The second preset condition includes at least one of the following: the link quality of the first link is greater than or equal to the first preset quality threshold; or the link quality of the second link is greater than or equal to the second preset quality threshold; or a bit error rate of transmission of the first data packet is less than or equal to a preset bit error rate threshold; or a quantity of repetitions of the first data packet is less than or equal to a preset quantity of repetitions.

It can be learned that in the foregoing technical solution, the terminal device may autonomously determine, based on a preset condition, whether to activate or deactivate the at least one link that is for performing duplication transmission.

Figure 6:
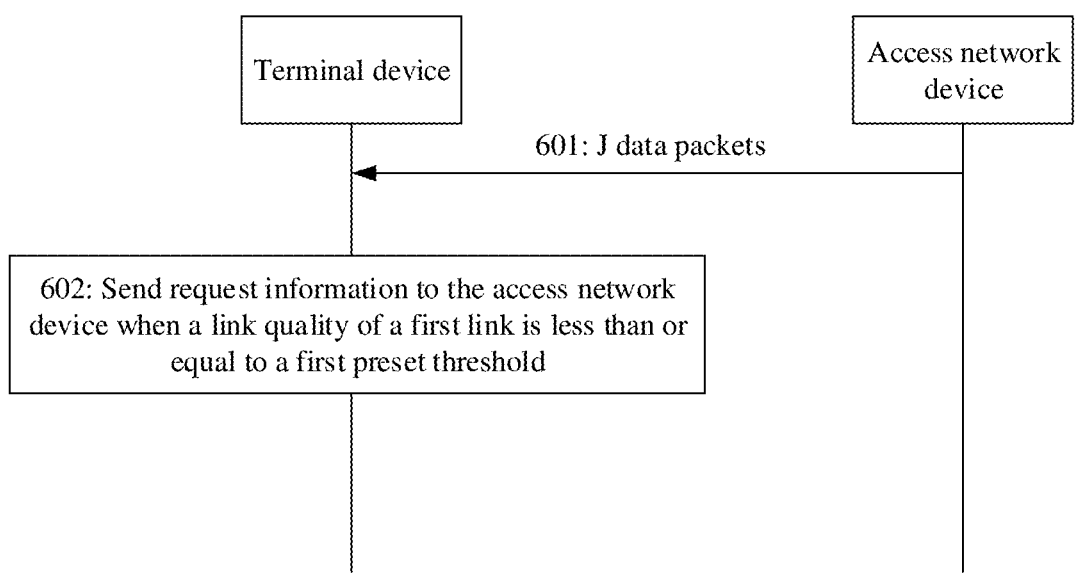
FIG. 6 is a schematic diagram of another communication method according to an embodiment of this application.

The following describes a process of transmitting downlink data between a terminal device and an access network device. Specifically, refer to FIG. 6. FIG. 6 is a schematic diagram of another communication method according to an embodiment of this application. With reference to FIG. 2, a terminal device in FIG. 6 is the terminal device 20 in FIG. 2, an access network device in FIG. 6 is the access network device 21 in FIG. 2, a first relay terminal in FIG. 6 may be the relay terminal 22 in FIG. 2, a second relay terminal in FIG. 6 may be the relay terminal 22 in FIG. 2, and a core network device in FIG. 6 may be the core network device 23 in FIG. 2. As shown in FIG. 6, the method includes but is not limited to the following steps.

601: The terminal device receives J data packets sent by the access network device in a duplication transmission mode, where J is an integer greater than 1.

It may be understood that the access network device may determine a second data packet, obtain the J data packets through duplicating the second data packet, and send the J data packets to the terminal device in the duplication transmission mode. The second data packet may be a PDCP layer data packet, an RLC layer data packet, or a MAC layer data packet. Further, the second data packet may be a TCP/IP data packet. It may be understood that when the second data packet is the PDCP layer data packet, the access network device may duplicate the second data packet at a PDCP layer of the access network device. When the second data packet is the RLC layer data packet, the access network device may duplicate the second data packet at an RLC layer of the access network device. When the second data packet is the MAC layer data packet, the access network device may duplicate the second data packet at a MAC layer of the access network device. When the second data packet is the TCP/IP data packet, the access network device may duplicate the second data packet at a transport layer of the access network device.

That the terminal device receives J data packets sent by the access network device in a duplication transmission mode includes:

The terminal device receives, through an air interface, K data packets in the J data packets sent by the access network device, where K is an integer greater than 0 and less than J.

The terminal device receives J-K data packets in the J data packets over a first relay link, where the first relay link includes a first link and a second link, the first link is a link between the terminal device and a first relay terminal, and the second link is a link between the first relay terminal and the access network device.

K may be, for example, a value such as 2, 3, 4, 5, 6, 13, or 14.

For the air interface, refer to the content about the air interface in step 301 in FIG. 3. Details are not described herein again.

That the terminal device receives, through an air interface, K data packets in the J data packets sent by the access network device includes: The terminal device receives, over P links on the air interface, the K data packets sent by the access network device. In other words, the terminal device receives, on P carriers, the K data packets sent by the access network device. Further, P may alternatively be K, or may be an integer greater than K. This is not limited herein.

For the link between the terminal device and the first relay terminal, refer to the content about the link between the terminal device and the first relay terminal in step 301 in FIG. 3. Details are not described herein again.

When the J data packets are J PDCP layer data packets, the access network device may send the J PDCP layer data packets in the duplication transmission mode. Specifically, with reference to FIG. 4, for a protocol stack related to the terminal device, refer to the content about the protocol stack related to the terminal device in step 301 in FIG. 3. Details are not described herein again. For a protocol stack related to the first relay terminal, refer to the content about the protocol stack related to the first relay terminal in step 301 in FIG. 3. Details are not described herein again. For a protocol stack related to the access network device, refer to the content about the protocol stack related to the access network device in step 301 in FIG. 3. Details are not described herein again.

Further, the access network device may separately process K PDCP layer data packets in the J PDCP layer data packets at the RLC layer, the MAC layer, and a PHY layer of the access network device, to obtain K PHY layer data packets, and send the K PHY layer data packets to the terminal device through the air interface. When the terminal device receives the K PHY layer data packets, the terminal device may perform processing at a PHY layer, a MAC layer, and an RLC layer of the terminal device, to obtain K RLC layer data packets.

In addition, the access network device may further send J-K PDCP layer data packets in the J PDCP layer data packets to the terminal device via the first relay terminal. Specifically, the access network device may separately process the J-K PDCP layer data packets at the RLC layer, the MAC layer, and the PHY layer of the access network device, to obtain J-K PHY layer data packets, and send the J-K PHY layer data packets to the first relay terminal. Further, the first relay terminal may process the J-K PHY layer data packets at an RLC layer, a MAC layer, and a PHY layer of the first relay terminal, to obtain J-K RLC layer data packets corresponding to the first relay terminal. Then, the first relay terminal may process, by using a protocol stack corresponding to the first link, the J-K RLC layer data packets corresponding to the first relay terminal, to obtain J-K PHY layer data packets corresponding to the first link. For the protocol stack corresponding to the first link, refer to the content about the protocol stack corresponding to the first link in step 301 in FIG. 3. Details are not described herein again. It may be understood that when the protocol stack corresponding to the first link includes an RLC layer, a MAC layer, and a PHY layer, in this case, the first relay terminal may process, by using the protocol stack corresponding to the first link, the J-K RLC layer data packets corresponding to the first relay terminal, to obtain the J-K PHY layer data packets corresponding to the first link. Further, the first relay terminal may send the J-K PHY layer data packets corresponding to the first link to the terminal device. When receiving the J-K PHY layer data packets corresponding to the first link, the terminal device may process, by using the protocol stack corresponding to the first link, the J-K PHY layer data packets corresponding to the first link, to obtain J-K RLC layer data packets.

Further, with reference to FIG. 4, the terminal device may perform, at the PDCP layer of the terminal device, sorting and/or deduplication on the K RLC layer data packets and the J-K RLC layer data packets, and then further deliver the data packets to an upper layer of the PDCP layer of the terminal device.

602: The access network device receives request information sent by the terminal device.

For the request information, refer to the content about the request information in step 301 in FIG. 3. Details are not described herein again.

It can be learned that in the foregoing technical solution, at least one data packet is transmitted through the air interface, and at least one data packet is transmitted over the first relay link. In this way, a same data packet is duplicated and transmitted on different paths, so that a problem of how to improve data transmission reliability when there is an obstruction is resolved. In addition, when a quality of an existing relay link is poor, dynamic update of the relay link avoids a problem that duplication transmission over a relay link cannot be performed due to a poor link quality when there is an obstruction, and also avoids a problem that data transmission is unreliable when the duplication transmission over the relay link cannot be performed.

Optionally, the J data packets belong to a second service. The method further includes: The access network device receives sixth indication information sent by the core network device. Alternatively, the access network device determines, based on a protocol data unit session established between the terminal device and the core network device, to send service data of the second service in the duplication transmission mode.

The sixth indication information includes at least one of the following: a type identifier of the second service, a quality of service QoS parameter of the second service, a type of a QoS flow, and a protocol data unit session type.

The quality of service QoS parameter of the second service includes a QoS classification identifier (QCI), an allocation and retention priority (ARP), and the like. Different from the QoS parameter, the type of the QoS flow is for indicating that the QoS flow carries the second service, and the type of the QoS flow is for indicating a base station to transmit, in a relay duplication transmission mode, the second service carried on the QoS flow. The protocol data unit session type is for indicating that the protocol data unit session is for carrying the second service, and the protocol data unit session type is for indicating a base station to transmit, in a relay duplication transmission mode, the second service carried in the protocol data unit session.

It may be understood that the access network device may determine, based on the sixth indication information, to send the service data of the second service in the duplication transmission mode. Further, the access network device may determine, based on a rule preset in a protocol and the sixth indication information, to send the service data of the second service in the duplication transmission mode.

It can be learned that in the foregoing technical solution, the access network device can determine that service data corresponding to a service needs to be transmitted in a corresponding transmission mode. For example, data transmission needs to be performed in the duplication transmission mode through an air interface and over a relay link.

In a possible implementation, the method further includes:

The terminal device sends capability information to the access network device.

For the capability information, refer to the content about the capability information in step 302 in FIG. 3. Details are not described herein again.

It can be learned that in the foregoing technical solution, the terminal device reports the capability information, so that the access network device can determine, based on a capability of the terminal device, a transmission mode supported by the terminal device, and further determine a transmission mode to be used for communicating with the terminal device.

In a possible implementation, the method further includes: The terminal device sends second indication information to the access network device.

For the second indication information, refer to the content about the second indication information in step 302 in FIG. 3. Details are not described herein again.

It can be learned that in the foregoing technical solution, the terminal device reports, to the access network device, a candidate relay terminal that meets a condition, so that the access network device can select, based on indication information reported by the terminal device, an appropriate relay terminal for the terminal device to perform duplication transmission.

In a possible implementation, the method further includes: The terminal device receives third indication information sent by the access network device.

For the third indication information, refer to the content about the third indication information in step 302 in FIG. 3. Details are not described herein again.

It can be learned that in the foregoing technical solution, the access network device sends related information of a selected relay terminal or relay link to the terminal device, so that the terminal device can learn of a specific relay terminal or relay link that is for performing duplication transmission.

In a possible implementation, the method further includes: The terminal device sends fourth indication information to the first relay terminal.

For the fourth indication information, refer to the content about the fourth indication information in step 302 in FIG. 3. Details are not described herein again.

It can be learned that in the foregoing technical solution, indication information is sent to a relay terminal, so that the relay terminal can establish the second link with the access network device based on the indication information.

In a possible implementation, the method further includes: The terminal device receives configuration information.

For the configuration information, refer to the content about the configuration information in step 302 in FIG. 3. Details are not described herein again.

It can be learned that in the foregoing technical solution, the terminal device may learn of a correspondence between links based on the configuration information, to complete duplication transmission over a relay link in a subsequent process.

In a possible implementation, the method further includes: The terminal device receives control signaling sent by the access network device. Alternatively, the terminal device receives fifth indication information sent by the first relay terminal.

For the control signaling, refer to the content about the control signaling in step 302 in FIG. 3. Details are not described herein again. For the fifth indication information, refer to the content about the fifth indication information in step 302 in FIG. 3. Details are not described herein again.

It can be learned that in the foregoing technical solution, the access network device may send signaling to control whether each link, including a relay link and a non-relay link, for performing duplication transmission is in active mode or deactivated mode.

In a possible implementation, the method further includes: When a first preset condition is met, the terminal device activates at least one link that is for performing duplication transmission.

For the first preset condition, refer to the content about the first preset condition in step 302 in FIG. 3. Details are not described herein again.

In addition, when a second preset condition is met, the terminal device may deactivate at least one link that is for performing duplication transmission.

For the second preset condition, refer to the content about the second preset condition in step 302 in FIG. 3. Details are not described herein again.

It can be learned that in the foregoing technical solution, the terminal device may autonomously determine, based on a preset condition, whether to activate/deactivate the at least one link that is for performing duplication transmission.

Figure 7:
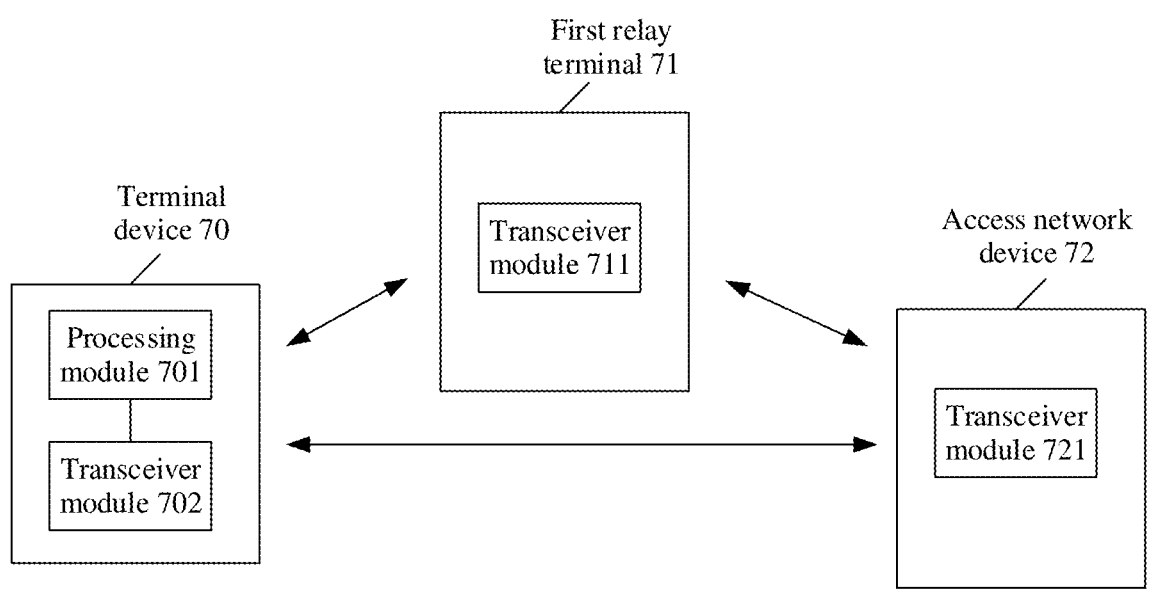
FIG. 7 shows another communication architecture according to an embodiment of this application.

The following describes another communication architecture. FIG. 7 shows another communication architecture according to an embodiment of this application. The communication architecture includes a terminal device 70, a first relay terminal 71, and an access network device 72. The terminal device 70 may be applied to the methods shown in FIG. 3 to FIG. 6. The first relay terminal 71 may be applied to the methods shown in FIG. 3 to FIG. 6. The access network device 72 may be applied to the methods shown in FIG. 3 to FIG. 6.

As shown in FIG. 7, the terminal device includes a processing module 701 and a transceiver module 702. The first relay terminal 71 includes a transceiver module 711. The access network device 72 includes a transceiver module 721.

According to a first aspect, the processing module 701 is configured to: determine a first data packet, and obtain M data packets through duplicating the first data packet, where M is an integer greater than 1; and the transceiver module 702 sends the M data packets to the access network device in a duplication transmission mode.

When sending the M data packets to the access network device in the duplication transmission mode, the transceiver module 702 is configured to: send N data packets in the M data packets to the access network device through an air interface, where N is an integer greater than 0 and less than M; and send M-N data packets in the M data packets to the access network device over a first relay link, where the first relay link includes a first link and a second link, the first link is a link between the terminal device and a first relay terminal, and the second link is a link between the first relay terminal and the access network device.

When a link quality of the first link is less than or equal to a first preset threshold, the transceiver module 702 is configured to: send request information to the access network device, where the request information is for requesting to update the first relay link to a second relay link, the second relay link includes a third link and a fourth link, the third link is a link between the terminal device and a second relay terminal, and the fourth link is a link between the second relay terminal and the access network device.

For the first data packet, refer to the content about the first data packet in step 301 in FIG. 3. Details are not described herein again. For the air interface, refer to the content about the air interface in step 301 in FIG. 3. Details are not described herein again. For the link between the terminal device and the first relay terminal, refer to the content about the link between the terminal device and the first relay terminal in step 301 in FIG. 3. Details are not described herein again. For the request information, refer to the content about the request information in step 302 in FIG. 3. Details are not described herein again. For the first preset threshold, refer to the content about the first preset threshold in step 302 in FIG. 3. Details are not described herein again.

It can be learned that in the foregoing technical solution, a data packet is duplicated, where at least one data packet obtained through duplication is transmitted through the air interface, and at least one data packet obtained through duplication is transmitted over the first relay link. In this way, a same data packet is duplicated and transmitted on different paths, so that a problem of unreliable data transmission caused by an obstruction occurs less frequently. In addition, when a quality of an existing relay link is poor, dynamic update of the relay link avoids a problem that duplication transmission over a relay link cannot be performed due to a poor link quality when there is an obstruction, and also avoids a problem that data transmission is unreliable when the duplication transmission over the relay link cannot be performed.

According to a second aspect, the transceiver module 702 is configured to receive J data packets sent by the access network device in a duplication transmission mode, where J is an integer greater than 1.

When receiving the J data packets sent by the access network device in the duplication transmission mode, the transceiver module 702 is configured to: receive, through an air interface, K data packets in the J data packets sent by the access network device, where K is an integer greater than 0 and less than J; and receive J-K data packets in the J data packets over a first relay link, where the first relay link includes a first link and a second link, the first link is a link between the terminal device and a first relay terminal, and the second link is a link between the first relay terminal and the access network device.

When a link quality of the first link is less than or equal to a first preset threshold, the transceiver module 702 is configured to: send request information to the access network device, where the request information is for requesting to update the first relay link to a second relay link, the second relay link includes a third link and a fourth link, the third link is a link between the terminal device and a second relay terminal, and the fourth link is a link between the second relay terminal and the access network device.

For the J data packets, refer to the content about the J data packets in step 601 in FIG. 6. Details are not described herein again. For the duplication transmission, refer to the content about the duplication transmission in step 601 in FIG. 6. Details are not described herein again. For the air interface, refer to the content about the air interface in step 601 in FIG. 6. Details are not described herein again. For the link between the terminal device and the first relay terminal, refer to the content about the link between the terminal device and the first relay terminal in step 601 in FIG. 6. Details are not described herein again. For the request information, refer to the content about the request information in step 602 in FIG. 6. Details are not described herein again. For the first preset threshold, refer to the content about the first preset threshold in step 302 in FIG. 3. Details are not described herein again.

It can be learned that in the foregoing technical solution, at least one data packet is transmitted through the air interface, and at least one data packet is transmitted over the first relay link. In this way, a same data packet is duplicated and transmitted on different paths, so that a problem of unreliable data transmission caused by an obstruction occurs less frequently. In addition, when a quality of an existing relay link is poor, dynamic update of the relay link avoids a problem that duplication transmission over a relay link cannot be performed due to a poor link quality when there is an obstruction, and also avoids a problem that data transmission is unreliable when the duplication transmission over the relay link cannot be performed.

Further, for more detailed descriptions of the transceiver module 701 and the processing module 702, refer to the related descriptions in the foregoing method embodiments. Details are not described herein again.

According to a third aspect, the transceiver module 721 is configured to receive M data packets sent by the terminal device in a duplication transmission mode, where M is an integer greater than 1.

When receiving the M data packets sent by the terminal device in the duplication transmission mode, the transceiver module 721 is configured to: receive, through an air interface, N data packets in the M data packets sent by the terminal device, where the M data packets are sent in the duplication transmission mode, and N is an integer greater than 0 and less than M; and receive M-N data packets in the M data packets over a first relay link, where the first relay link includes a first link and a second link, the first link is a link between the terminal device and a first relay terminal, and the second link is a link between the first relay terminal and the access network device.

The transceiver module 721 is configured to receive request information, where the request information is for requesting to update the first relay link to a second relay link, the second relay link includes a third link and a fourth link, the third link is a link between the terminal device and a second relay terminal, and the fourth link is a link between the second relay terminal and the access network device.

For the first data packet, refer to the content about the first data packet in step 301 in FIG. 3. Details are not described herein again. For the air interface, refer to the content about the air interface in step 301 in FIG. 3. Details are not described herein again. For the link between the terminal device and the first relay terminal, refer to the content about the link between the terminal device and the first relay terminal in step 301 in FIG. 3. Details are not described herein again. For the request information, refer to the content about the request information in step 302 in FIG. 3. Details are not described herein again. For a first preset threshold, refer to the content about the first preset threshold in step 302 in FIG. 3. Details are not described herein again.

It can be learned that in the foregoing technical solution, at least one data packet is transmitted through the air interface, and at least one data packet is transmitted over the first relay link. In this way, a same data packet is duplicated and transmitted on different paths, so that a problem of unreliable data transmission caused by an obstruction occurs less frequently. In addition, when a quality of an existing relay link is poor, dynamic update of the relay link avoids a problem that duplication transmission over a relay link cannot be performed due to a poor link quality when there is an obstruction, and also avoids a problem that data transmission is unreliable when the duplication transmission over the relay link cannot be performed.

According to a fourth aspect, the transceiver module 721 is configured to send J data packets to the terminal device in a duplication transmission mode, where J is an integer greater than 1.

When sending the J data packets to the terminal device in the duplication transmission mode, the transceiver module 721 is configured to: send K data packets in the J data packets to the terminal device through an air interface, where the J data packets are sent in the duplication transmission mode, J is an integer greater than 1, and K is an integer greater than 0 and less than J; and send J-K data packets in the J data packets to the terminal device over a first relay link, where the first relay link includes a first link and a second link, the first link is a link between the terminal device and a first relay terminal, and the second link is a link between the first relay terminal and the access network device.

The transceiver module 721 is configured to receive request information, where the request information is for requesting to update the first relay link to a second relay link, the second relay link includes a third link and a fourth link, the third link is a link between the terminal device and a second relay terminal, and the fourth link is a link between the second relay terminal and the access network device.

For the J data packets, refer to the content about the J data packets in step 601 in FIG. 6. Details are not described herein again. For the air interface, refer to the content about the air interface in step 601 in FIG. 6. Details are not described herein again. For the link between the terminal device and the first relay terminal, refer to the content about the link between the terminal device and the first relay terminal in step 601 in FIG. 6. Details are not described herein again. For the request information, refer to the content about the request information in step 602 in FIG. 6. Details are not described herein again. For a first preset threshold, refer to the content about the first preset threshold in step 302 in FIG. 3. Details are not described herein again.

It can be learned that in the foregoing technical solution, at least one data packet is transmitted through the air interface, and at least one data packet is transmitted over the first relay link. In this way, a same data packet is duplicated and transmitted on different paths, so that a problem of unreliable data transmission caused by an obstruction occurs less frequently. In addition, when a quality of an existing relay link is poor, dynamic update of the relay link avoids a problem that duplication transmission over a relay link cannot be performed due to a poor link quality when there is an obstruction, and also avoids a problem that data transmission is unreliable when the duplication transmission over the relay link cannot be performed.

Further, for more detailed descriptions of the transceiver module 721, refer to the related descriptions in the foregoing method embodiments. Details are not described herein again.

Figure 8:
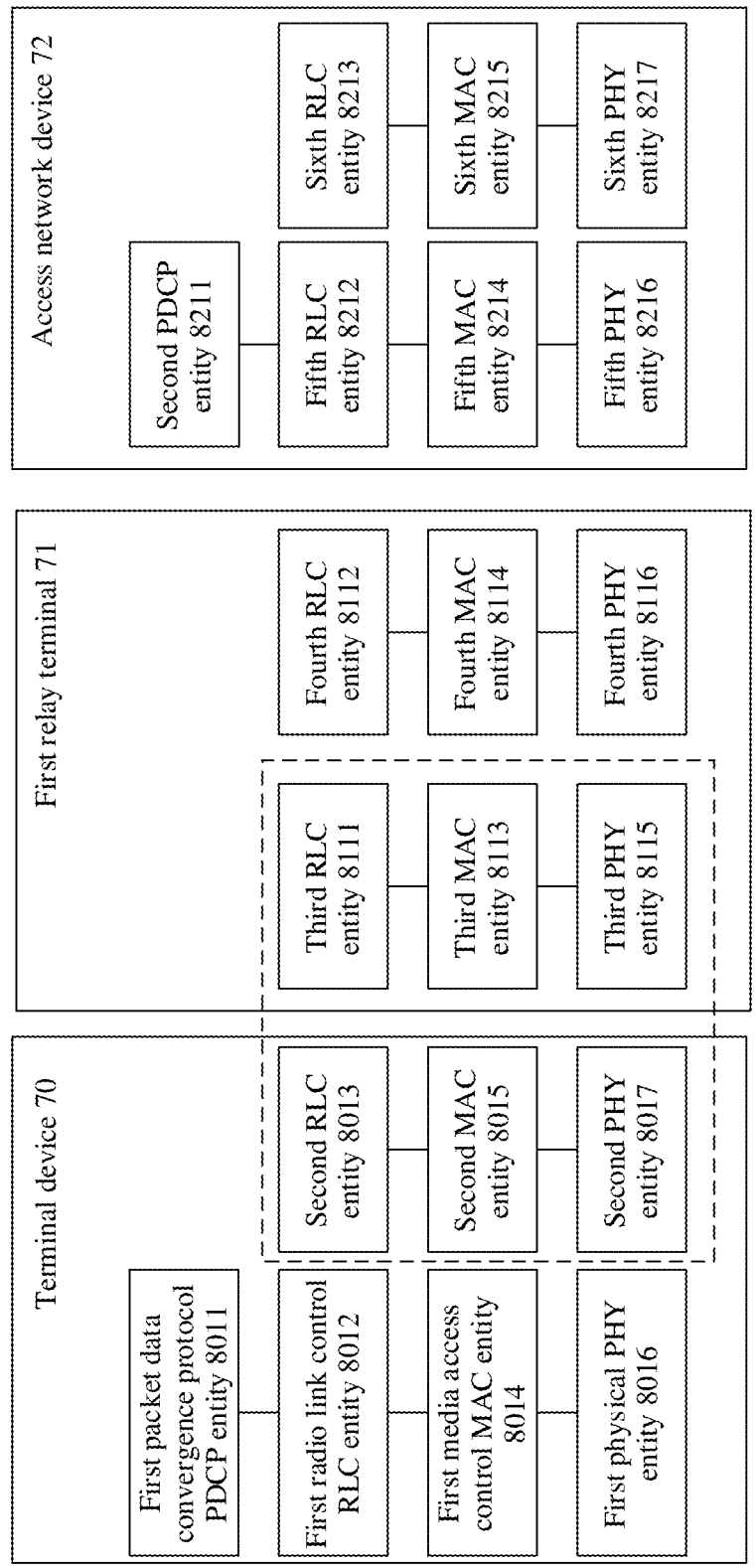
FIG. 8 is a schematic diagram of structures of a terminal device 70, a first relay terminal 71, and an access network device 72 in FIG. 7.

Further, refer to FIG. 8. FIG. 8 is a schematic diagram of structures of the terminal device 70, the first relay terminal 71, and the access network device 72 in FIG. 7. As shown in FIG. 8, the terminal device 70 may include a first PDCP entity 8011, a first RLC entity 8012, a second RLC entity 8013, a first MAC entity 8014, a second MAC entity 8015, a first PHY entity 8016, and a second PHY entity 8017. The first PDCP entity 8011 is connected to the first RLC entity 8012, the first RLC entity 8012 is connected to the first MAC entity 8014, and the first MAC entity 8014 is connected to the first PHY entity 8016. There is an association relationship between the first PDCP entity 8011 and the second RLC entity 8013. The second RLC entity 8013 is connected to the second MAC entity 8015, and the second MAC entity 8015 is connected to the second PHY entity 8017. It may be understood that the second RLC entity 8013 may include at least one second RLC entity, the second MAC entity 8015 may include at least one second MAC entity, and the second PHY entity 8017 may include at least one second PHY entity.

Further, with reference to FIG. 8, the first relay terminal 71 may include a third RLC entity 8111, a fourth RLC entity 8112, a third MAC entity 8113, a fourth MAC entity 8114, a third PHY entity 8115, and a fourth PHY entity 8116. There is an association relationship between the first PDCP entity 7011 and the third RLC entity 8111, and there is an association relationship between the third RLC entity 8111 and the fourth RLC entity 8112. The third RLC entity 8111 is connected to the third MAC entity 8113, and the third MAC entity 8113 is connected to the third PHY entity 8115. The fourth RLC entity 8112 is connected to the fourth MAC entity 8114, and the fourth MAC entity 8114 is connected to the fourth PHY entity 8116. It may be understood that the third RLC entity 8111 may include at least one third RLC entity, the third MAC entity 8113 may include at least one third MAC entity, and the third PHY entity 8115 may include at least one third PHY entity.

The access network device 72 may include a second PDCP entity 8211, a fifth RLC entity 8212, a sixth RLC entity 8213, a fifth MAC entity 8214, a sixth MAC entity 8215, a fifth PHY entity 8216, and a sixth PHY entity 8217. The second PDCP entity 8211 is connected to the fifth RLC entity 8212, the fifth RLC entity 8212 is connected to the fifth MAC entity 8214, and the fifth MAC entity 8214 is connected to the fifth PHY entity 8216. There is an association relationship between the second PDCP entity 8211 and the sixth RLC entity 8213. The sixth RLC entity 8213 is connected to the sixth MAC entity 8215, and the sixth MAC entity 8215 is connected to the sixth PHY entity 8217. It may be understood that the sixth RLC entity 8213 may include at least one sixth RLC entity, the sixth MAC entity 8215 may include at least one sixth MAC entity, and the sixth PHY entity 8217 may include at least one sixth PHY entity.

Further, with reference to FIG. 8, when a first data packet is a PDCP layer data packet, M data packets are M PDCP layer data packets. When sending the M data packets to the access network device in a duplication transmission mode, the first PDCP entity 8011 is configured to: deliver N PDCP layer data packets in the M PDCP layer data packets to the first RLC entity 8012, and deliver M-N PDCP layer data packets in the M PDCP layer data packets to the second RLC entity 8013.

Further, the first RLC entity 8012 is configured to: process the N PDCP layer data packets to obtain N RLC layer data packets, and deliver the N RLC layer data packets to the first MAC entity 8014. The first MAC entity 8014 is configured to: process the N RLC layer data packets to obtain N MAC layer data packets, and deliver the N MAC layer data packets to the first PHY entity 8016. The first PHY entity 8016 is configured to process the N MAC layer data packets to obtain N PHY layer data packets. Further, the transceiver module 702 is configured to send the N PHY layer data packets to the access network device 72 through the air interface. The transceiver module 721 of the access network device 72 is configured to receive the N PHY layer data packets. Further, the fifth PHY entity 8216 is configured to deliver the N PHY layer data packets to the fifth MAC entity 8214. The fifth MAC entity 8214 is configured to: process the N PHY layer data packets to obtain N MAC layer data packets, and deliver the N MAC layer data packets to the fifth RLC entity 8212. The fifth RLC entity 8212 is configured to: process the N MAC layer data packets to obtain N RLC layer data packets, and deliver the N RLC layer data packets to the second PDCP entity 8211.

Further, the second RLC entity 8013 is configured to: process the M-N PDCP layer data packets to obtain M-N RLC layer data packets, and deliver the M-N RLC layer data packets to the second MAC entity 8015. The second MAC entity 8015 is configured to: process the M-N RLC layer data packets to obtain M-N MAC layer data packets, and deliver the M-N MAC layer data packets to the second PHY entity 8017. The second PHY entity 8017 is configured to process the M-N MAC layer data packets to obtain M-N PHY layer data packets. Further, the transceiver module 702 is configured to send the M-N PHY layer data packets to the first relay terminal 71. The transceiver module 711 of the first relay terminal 71 is configured to receive the M-N PHY layer data packets. Further, the third PHY entity 8115 is configured to deliver the M-N PHY layer data packets to the third MAC entity 8113. The third MAC entity 8113 is configured to: process the M-N PHY layer data packets to obtain M-N MAC layer data packets, and deliver the M-N MAC layer data packets to the third RLC entity 8111.

Because there is the association relationship between the third RLC entity 8111 and the fourth RLC entity 8112, the third RLC entity delivers processed M-N data packets to the fourth RLC entity 8112. The fourth RLC entity 8112 is configured to: process the M-N data packets to obtain M-N RLC layer data packets, and deliver the M-N RLC layer data packets to the fourth MAC entity 8114. The fourth MAC entity 8114 is configured to: process the M-N RLC layer data packets to obtain M-N MAC layer data packets, and deliver the M-N MAC layer data packets to the fourth PHY entity 8116. The fourth PHY entity 8116 is configured to process the M-N MAC layer data packets to obtain M-N PHY layer data packets. Further, the transceiver module 711 is configured to send the M-N PHY layer data packets to the access network device 72. The transceiver module 721 of the access network device 72 is configured to receive the M-N PHY layer data packets. Further, the sixth PHY entity 8217 is configured to deliver the M-N PHY layer data packets to the sixth MAC entity 8215. The sixth MAC entity 8215 is configured to: process the M-N PHY layer data packets to obtain M-N MAC layer data packets, and deliver the M-N MAC layer data packets to the sixth RLC entity 8213. The sixth RLC entity 8213 is configured to: process the M-N MAC layer data packets to obtain M-N RLC layer data packets, and deliver the M-N RLC layer data packets to the second PDCP entity 8211.

Further, the second PDCP entity 8211 may perform sorting and/or deduplication on the N RLC layer data packets and the M-N RLC layer data packets, and then further deliver the data packets to an entity corresponding to an upper layer of the PDCP layer.

It should be noted that when J data packets are J PDCP layer data packets, the transceiver module 702 is configured to send the J PDCP layer data packets in a duplication transmission mode. Specifically, the second PDCP entity 8211 of the access network device is configured to: deliver K PDCP layer data packets in the J PDCP layer data packets to the fifth RLC entity 8212, and deliver J-K PDCP layer data packets in the J PDCP layer data packets to the sixth RLC entity 8213.

Further, the fifth RLC entity 8212 is configured to: process the K PDCP layer data packets to obtain K RLC layer data packets, and deliver the K RLC layer data packets to the fifth MAC entity 8214. The fifth MAC entity 8214 is configured to: process the K RLC layer data packets to obtain K MAC layer data packets, and deliver the K MAC layer data packets to the fifth PHY entity 8216. The fifth PHY entity 8216 is configured to process the K MAC layer data packets to obtain K PHY layer data packets. Further, the transceiver module 721 is configured to send the K PHY layer data packets to the terminal device 70 through the air interface. The transceiver module 702 of the terminal device 70 is configured to receive the K PHY layer data packets. Further, the first PHY entity 8016 is configured to deliver the K PHY layer data packets to the first MAC entity 8014. The first MAC entity 8014 is configured to: process the K PHY layer data packets to obtain K MAC layer data packets, and deliver the K MAC layer data packets to the first RLC entity 8012. The first RLC entity 8012 is configured to: process the K MAC layer data packets to obtain K RLC layer data packets, and deliver the K RLC layer data packets to the first PDCP entity 8011.

Further, the sixth RLC entity 8213 is configured to: process the J-K PDCP layer data packets to obtain J-K RLC layer data packets, and deliver the J-K RLC layer data packets to the sixth MAC entity 8215. The sixth MAC entity 8215 is configured to: process the J-K RLC layer data packets to obtain J-K MAC layer data packets, and deliver the J-K MAC layer data packets to the sixth PHY entity 8217. The sixth PHY entity 8217 is configured to process the J-K MAC layer data packets to obtain J-K PHY layer data packets. Further, the transceiver module 721 is configured to send the J-K PHY layer data packets to the first relay terminal 71. The transceiver module 711 of the first relay terminal 71 is configured to receive the J-K PHY layer data packets. Further, the fourth PHY entity 8116 is configured to deliver the J-K PHY layer data packets to the fourth MAC entity 8114. The fourth MAC entity 8112 is configured to: process the J-K PHY layer data packets to obtain J-K MAC layer data packets, and deliver the J-K MAC layer data packets to the fourth RLC entity 8112. Because there is the association relationship between the third RLC entity 8111 and the fourth RLC entity 8112, the fourth RLC entity delivers processed J-K data packets to the third RLC entity 8111. The third RLC entity 8111 is configured to: process the J-K data packets to obtain J-K RLC layer data packets, and transfer the J-K RLC layer data packets to the third MAC entity 8113. The third MAC entity 8113 is configured to: process the J-K RLC layer data packets to obtain J-K MAC layer data packets, and transfer the J-K MAC layer data packets to the third PHY entity 8115. The third PHY entity 8115 is configured to process the J-K MAC layer data packets to obtain J-K PHY layer data packets. Further, the transceiver module 711 is configured to send the J-K PHY layer data packets to the terminal device 70. The transceiver module 702 of the terminal device 70 is configured to receive the J-K PHY layer data packets. Further, the second PHY entity 8017 is configured to transfer the J-K PHY layer data packets to the second MAC entity 8015. The second MAC entity 8015 is configured to: process the J-K PHY layer data packets to obtain J-K MAC layer data packets, and transfer the J-K MAC layer data packets to the second RLC entity 8013. The second RLC entity 8013 is configured to: process the J-K MAC layer data packets to obtain J-K RLC layer data packets, and transfer the J-K RLC layer data packets to the first PDCP entity 8011.

Further, the first PDCP entity 8011 is configured to, after performing sorting and/or deduplication on the K RLC layer data packets and the J-K RLC layer data packets, further deliver the data packets to an entity corresponding to an upper layer of the PDCP layer.

In a possible implementation, when the terminal device or the access network device is a chip, the transceiver module 701 or the transceiver module 721 may be an interface, a pin, a circuit, or the like. The interface may be configured to input to-be-processed data to a processor, and may output a processing result of the processor to the outside. During specific implementation, the interface may be a general purpose input output (GPIO) interface, and may be connected to a plurality of peripheral devices (for example, a display (LCD), a camera, a radio frequency (RF) module, and an antenna). The interface is connected to the processor through a bus. For example, the interface may be configured to send the M data packets to the access network device in the duplication transmission mode.

The processing module 702 may be a processor. The processor may execute computer-executable instructions stored in a storage module, so that the chip performs the methods according to the embodiments in FIG. 3 to FIG. 6.

Further, the processor may include a controller, an arithmetic unit, and a register. For example, the controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. During specific implementation, a hardware architecture of the processor may be an application-specific integrated circuit (ASIC) architecture, a microprocessor without interlocked piped stages architecture (MIPS), an advanced reduced instruction set computing machines (ARM) architecture, a network processor (NP) architecture, or the like. The processor may be a single-core or multi-core processor.

The storage module may be a storage module in the chip, for example, a register or a cache. Alternatively, the storage module may be a storage module located outside the chip, for example, a read-only memory (ROM), another type of static storage device that can store static information and instructions, or a random access memory (RAM).

It should be noted that a function corresponding to each of the processor and the interface may be implemented by using a hardware design, may be implemented by using a software design, or may be implemented by a combination of software and hardware. This is not limited herein.

Figure 9:
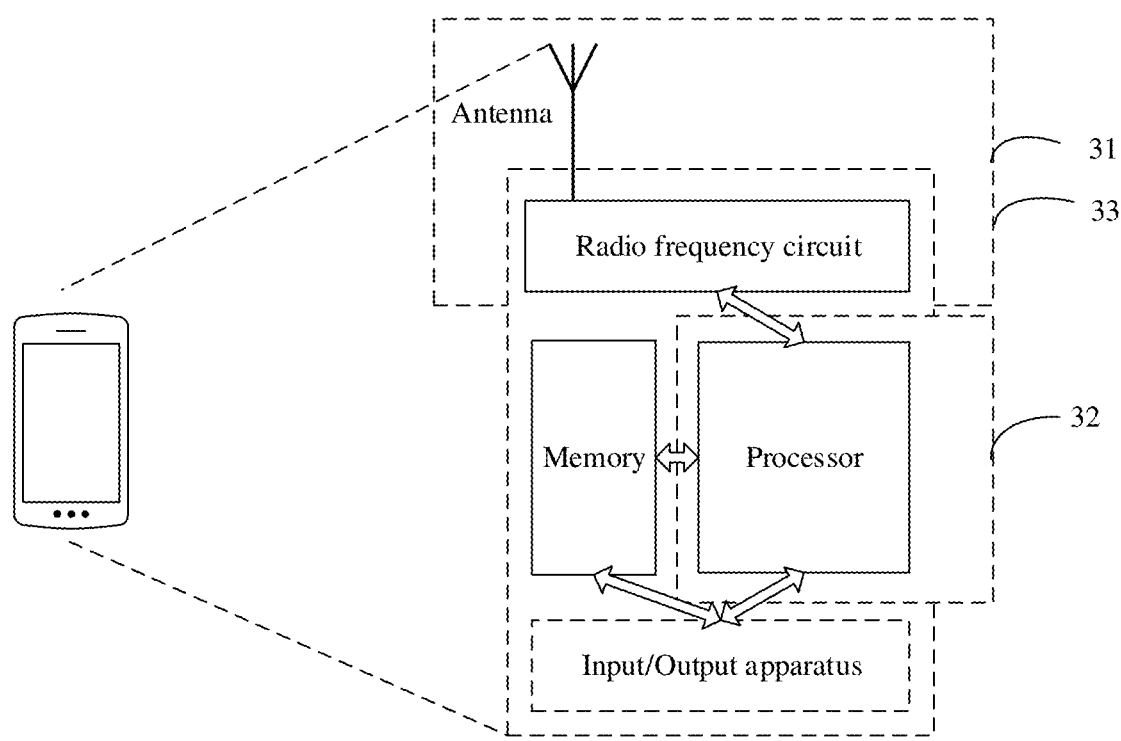
FIG. 9 is a schematic diagram of a structure of a simplified terminal device according to an embodiment of this application.

FIG. 9 is a schematic diagram of a structure of a simplified terminal device according to an embodiment of this application. For ease of understanding and convenience of figure illustration, an example in which the terminal device is a mobile phone is used in FIG. 9. As shown in FIG. 9, the terminal device includes at least one processor, and may further include a radio frequency circuit, an antenna, and an input/output apparatus. The processor may be configured to process a communication protocol and communication data, and may be further configured to control the terminal device, execute a software program, process data of the software program, and the like. The terminal device may further include a memory. The memory is mainly configured to store a software program and data. These related programs may be loaded into the memory when the communication apparatus is delivered from a factory, or may be loaded into the memory when needed later. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to a user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal, and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, an antenna having sending and receiving functions and the radio frequency circuit may be considered as a receiving unit and a sending unit (which may also be collectively referred to as a transceiver unit) of the terminal device, and a processor having a processing function may be considered as a processing unit of the terminal device. As shown in FIG. 9, the terminal device includes a receiving module 31, a processing module 32, and a sending module 33. The receiving module 31 may also be referred to as a receiver, a receiver circuit, or the like. The sending module 33 may also be referred to as a transmitter, a transmitter circuit, or the like. The processing module 32 may also be referred to as a processor, a processing board, a processing apparatus, or the like.

For example, the processing module 32 is configured to perform a function of the terminal device in step 301 in the embodiment shown in FIG. 3.

Figure 10:
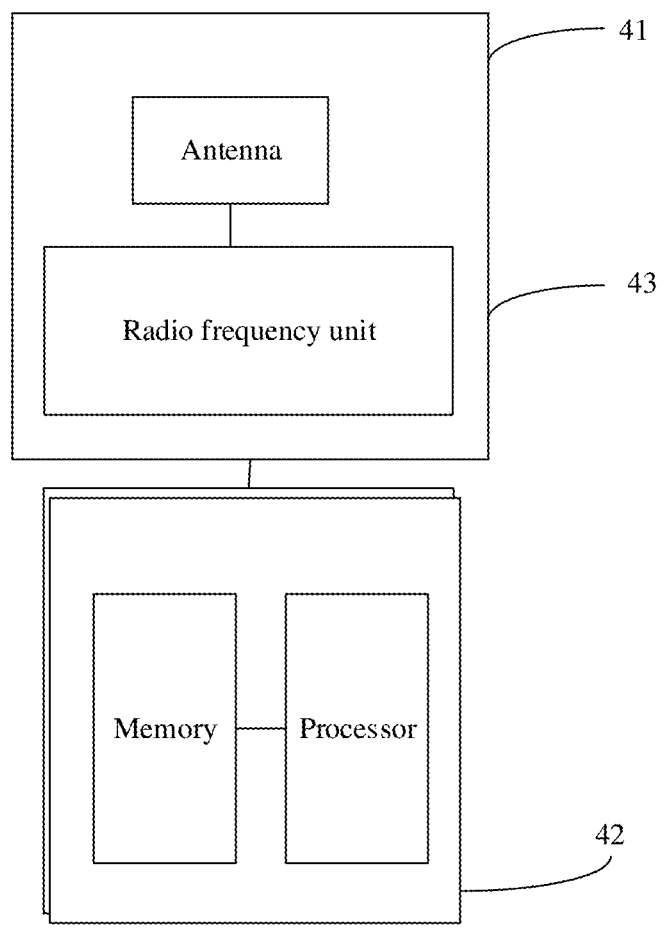
FIG. 10 is a schematic diagram of a structure of a simplified access network device according to an embodiment of this application.

FIG. 10 is a schematic diagram of a structure of a simplified access network device according to an embodiment of this application. The access network device includes a part 42 and a part for radio frequency signal sending/receiving and conversion. The part for radio frequency signal sending/receiving and conversion further includes a receiving module 41 and a sending module 43 (which may also be collectively referred to as a transceiver module). The part for radio frequency signal sending/receiving and conversion is mainly configured to send/receive a radio frequency signal and perform conversion between the radio frequency signal and a baseband signal. The part 42 is mainly configured to perform baseband processing, control the access network device, and the like. The receiving module 41 may also be referred to as a receiver, a receiver circuit, or the like. The sending module 43 may also be referred to as a transmitter, a transmitter circuit, or the like. The part 42 is usually a control center of the access network device, may be usually referred to as a processing module, and is configured to control the access network device to perform the steps performed by the access network device in FIG. 3 to FIG. 6. For details, refer to the foregoing descriptions of the related parts.

The part 42 may include one or more boards. Each board may include one or more processors and one or more memories. The processor is configured to read and execute a program in the memory to implement a baseband processing function and control the access network device. If there are a plurality of boards, the boards may be interconnected to improve a processing capability. In an optional implementation, the plurality of boards may share one or more processors, the plurality of boards may share one or more memories, or the plurality of boards may share one or more processors at the same time.

For example, the receiving module 41 is configured to perform a function of the access network device in step 302 in the embodiment shown in FIG. 3.

An embodiment of this application further provides a terminal device/access network device. The terminal device/access network device is configured to perform the foregoing communication methods. All or a part of the foregoing communication may be implemented by using hardware or software.

Optionally, during specific implementation, the terminal device/access network device may be a chip or an integrated circuit.

Optionally, when all or a part of the communication methods in the foregoing embodiments are implemented by using software, the terminal device/access network device includes at least one processor, configured to execute a program. When the program is executed, the terminal device/access network device is enabled to implement the communication methods provided in the foregoing embodiments. The terminal device/access network device may further include a memory, configured to store a necessary program. These related programs may be loaded into the memory when the terminal device/access network device is delivered from a factory, or may be loaded into the memory when needed later.

Optionally, the memory may be a physically independent unit, or may be integrated with the processor.

Optionally, when all or a part of the communication methods in the foregoing embodiments are implemented by using software, the terminal device/access network device may alternatively include only at least one processor. A memory configured to store a program is located outside the terminal device/access network device. The processor is connected to the memory through a circuit/cable, and is configured to read and execute the program stored in the memory.

Each processor may be a central processing unit (CPU), a network processor (NP), or a combination of a CPU and an NP.

Optionally, each processor may include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

This application further provides a computer-readable storage medium. The computer-readable storage medium stores a computer program. When the computer program is run, the method according to any possible implementation in FIG. 3 to FIG. 6 is implemented.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A communication method, applied to a terminal device, comprising:
    determining a first data packet, obtaining M data packets through duplicating the first data packet, and sending the M data packets to an access network device in a duplication transmission mode, wherein M is an integer greater than 1, wherein
    the sending the M data packets to an access network device in a duplication transmission mode comprises:
    sending N data packets in the M data packets to the access network device through an air interface, wherein N is an integer greater than 0 and less than M; and
    sending M-N data packets in the M data packets to the access network device over a first relay link, wherein the first relay link comprises a first link and a second link, the first link is a link between the terminal device and a first relay terminal, and the second link is a link between the first relay terminal and the access network device; and
    sending request information to the access network device when a link quality of the first link is less than or equal to a first preset threshold, wherein the request information is for requesting to update the first relay link to a second relay link, the second relay link comprises a third link and a fourth link, the third link is a link between the terminal device and a second relay terminal, and the fourth link is a link between the second relay terminal and the access network device.

2. The method according to claim 1, wherein the first data packet belongs to a first service, and the method further comprises:
    sending first indication information to the access network device, wherein
    the first indication information comprises at least one of the following: a type identifier of the first service, a quality of service requirement of the first service, a type of the terminal device, location information of the terminal device, or the link quality of the first link.

3. The method according to claim 1, wherein the request information comprises at least one of the following: an identifier of the second relay terminal, an identifier of a PC5 interface between the terminal device and the second relay terminal, a link identifier of the third link, or a link quality of the third link.

4. The method according to claim 1, wherein the method further comprises:
    sending capability information to the access network device, wherein the capability information indicates at least one of the following capabilities:
    the terminal device supports communication with the access network device over a relay link;
    the terminal device supports first duplication transmission, wherein at least one link for the first duplication transmission is a relay link;
    the terminal device supports second duplication transmission, wherein the second duplication transmission comprises at least two links over which carrier aggregation duplication transmission is performed and at least one relay link;
    a maximum quantity of relay links that are used for duplication transmission and that are supported by the terminal device; and
    a maximum quantity of relay terminals that are used for duplication transmission and that are supported by the terminal device.

5. The method according to claim 1, wherein the method further comprises:
    sending second indication information to the access network device, wherein the second indication information indicates at least one of the following: an identifier of at least one relay terminal that can establish a relay link with the terminal device, an identifier of a PC5 interface of the at least one relay terminal that can establish the relay link with the terminal device, an identifier of a relay link of the at least one relay terminal that can establish the relay link with the terminal device, and a link quality of at least one relay link that can be established with the terminal device.

6. The method according to claim 1, wherein the method further comprises:
receiving third indication information sent by the access network device, wherein the third indication information indicates an identifier of the first relay terminal that establishes the first relay link with the terminal device, an identifier of a PC5 interface of the first relay link that is established with the terminal device, or an identifier of the first link.

7. The method according to claim 6, wherein the method further comprises:
sending fourth indication information to the first relay terminal, wherein the fourth indication information indicates the first relay terminal to establish the second link with the access network device.

8. A terminal device, comprising: at least one processor and at least one memory storing instructions; wherein the instructions are executed by the at least one processor to perform a method of:
determining a first data packet, obtaining M data packets through duplicating the first data packet, and sending the M data packets to an access network device in a duplication transmission mode, wherein M is an integer greater than 1, wherein
the sending the M data packets to an access network device in a duplication transmission mode comprises:
sending N data packets in the M data packets to the access network device through an air interface, wherein N is an integer greater than 0 and less than M; and
sending M-N data packets in the M data packets to the access network device over a first relay link, wherein the first relay link comprises a first link and a second link, the first link is a link between the terminal device and a first relay terminal, and the second link is a link between the first relay terminal and the access network device; and
sending request information to the access network device when a link quality of the first link is less than or equal to a first preset threshold, wherein the request information is for requesting to update the first relay link to a second relay link, the second relay link comprises a third link and a fourth link, the third link is a link between the terminal device and a second relay terminal, and the fourth link is a link between the second relay terminal and the access network device.

9. The terminal device according to claim 8, wherein the first data packet belongs to a first service, and the method further comprises:
sending first indication information to the access network device, wherein
the first indication information comprises at least one of the following: a type identifier of the first service, a quality of service requirement of the first service, a type of the terminal device, location information of the terminal device, or the link quality of the first link.

10. The terminal device according to claim 8, wherein the request information comprises at least one of the following: an identifier of the second relay terminal, an identifier of a PC5 interface between the terminal device and the second relay terminal, a link identifier of the third link, or a link quality of the third link.

11. The terminal according to claim 8, wherein the method further comprises:
sending capability information to the access network device, wherein the capability information indicates at least one of the following capabilities:
the terminal device supports communication with the access network device over a relay link;
the terminal device supports first duplication transmission, wherein at least one link for the first duplication transmission is a relay link;
the terminal device supports second duplication transmission, wherein the second duplication transmission comprises at least two links over which carrier aggregation duplication transmission is performed and at least one relay link;
a maximum quantity of relay links that are used for duplication transmission and that are supported by the terminal device; and
a maximum quantity of relay terminals that are used for duplication transmission and that are supported by the terminal device.

12. The terminal device according to claim 8, wherein the method further comprises:
sending second indication information to the access network device, wherein the second indication information indicates at least one of the following: an identifier of at least one relay terminal that can establish a relay link with the terminal device, an identifier of a PC5 interface of the at least one relay terminal that can establish the relay link with the terminal device, an identifier of a relay link of the at least one relay terminal that can establish the relay link with the terminal device, and a link quality of at least one relay link that can be established with the terminal device.

13. The terminal device according to claim 8, wherein the method further comprises:
receiving third indication information sent by the access network device, wherein the third indication information indicates an identifier of the first relay terminal that establishes the first relay link with the terminal device, an identifier of a PC5 interface of the first relay link that is established with the terminal device, or an identifier of the first link.

14. The terminal device according to claim 13, wherein the method further comprises:
sending fourth indication information to the first relay terminal, wherein the fourth indication information indicates the first relay terminal to establish the second link with the access network device.

15. An access network device, comprising: at least one processor and at least one memory storing instructions; wherein the instructions are executed by the at least one processor to perform a method of:
receiving M data packets sent by a terminal device in a duplication transmission mode, wherein M is an integer greater than 1, wherein
the receiving M data packets sent by a terminal device in a duplication transmission mode comprises:
receiving, through an air interface, N data packets in the M data packets sent by the terminal device, wherein the M data packets are sent in the duplication transmission mode, and N is an integer greater than 0 and less than M; and
receiving M-N data packets in the M data packets over a first relay link, wherein the first relay link comprises a first link and a second link, the first link is a link between the terminal device and a first relay terminal, and the second link is a link between the first relay terminal and the access network device; and
receiving request information, wherein the request information is for requesting to update the first relay link to a second relay link, the second relay link comprises a third link and a fourth link, the third link is a link between the terminal device and a second relay terminal, and the fourth link is a link between the second relay terminal and the access network device.

16. The access network device according to claim 15, wherein the M data packets belong to a first service, and the method further comprises:

receiving first indication information sent by the terminal device, wherein the first indication information comprises at least one of the following: a type identifier of the first service, a quality of service requirement of the first service, a type of the terminal device, location information of the terminal device, or a link quality of the first link.

17. The access network device according to claim 15, wherein the request information comprises at least one of the following: an identifier of the second relay terminal, an identifier of a PC5 interface between the terminal device and the second relay terminal, a link identifier of the third link, or a link quality of the third link.

18. The access network device according to claim 15, wherein the method further comprises:

receiving capability information sent by the terminal device, wherein the capability information indicates at least one of the following:

the terminal device supports communication with the access network device over a relay link;

the terminal device supports first duplication transmission, wherein at least one link for the first duplication transmission is a relay link;

the terminal device supports second duplication transmission, wherein the second duplication transmission comprises at least two links over which carrier aggregation duplication transmission is performed and at least one relay link;

a maximum quantity of relay links that are used for duplication transmission and that are supported by the terminal device; and a maximum quantity of relay terminals that are used for duplication transmission and that are supported by the terminal device.

19. The access network device according to claim 15, wherein the method further comprises:

receiving second indication information sent by the terminal device, wherein the second indication information indicates at least one of the following: an identifier of at least one relay terminal that can establish a relay link with the terminal device, an identifier of a PC5 interface of the at least one relay terminal that can establish the relay link with the terminal device, an identifier of a relay link of the at least one relay terminal that can establish the relay link with the terminal device, and a link quality of at least one relay link that can be established with the terminal device.

20. The access network device according to claim 15, wherein the method further comprises:

sending third indication information to the terminal device, wherein the third indication information indicates an identifier of the first relay terminal that establishes the first relay link with the terminal device, an identifier of a PC5 interface of the first relay link that is established with the terminal device, or an identifier of the first link.

* * * * *

UNITED STATES PATENT AND TRADEMARK OFFICE
CERTIFICATE OF CORRECTION

| | | |
|---|---|---|
| PATENT NO. | : 12,402,027 B2 | |
| APPLICATION NO. | : 18/076515 | |
| DATED | : August 26, 2025 | |
| INVENTOR(S) | : Bin Xu et al. | |

It is certified that error appears in the above-identified patent and that said Letters Patent is hereby corrected as shown below:

On the Title Page

Item (57) The Abstract should be replaced with:
A communication method. N data packets are sent in M data packets to an access network device through an air interface. M–N data packets are sent in the M data packets to the access network device over a first relay link, wherein the first relay link includes a first link and a second link, the first link is a link between a terminal device and a first relay terminal, and the second link is a link between the first relay terminal and the access network device. Request information is sent to the access network device when a link quality of the first link is less than or equal to a first preset threshold, wherein the request information is for requesting to update the first relay link to a second relay link.

In the Claims

Replace Column 43, Line 55-Column 48, Line 31, (approx.) with:
1. A communication method, comprising:
determining, by a terminal device, a first data packet, obtaining M data packets through duplicating the first data packet, and sending the M data packets to an access network device in a duplication transmission mode, wherein M is an integer greater than 1, wherein
the sending the M data packets to an access network device in a duplication transmission mode includes:
sending, by the terminal device, N data packets in the M data packets to the access network device through an air interface, wherein N is an integer greater than 0 and less than M; and
sending, by the terminal device, M–N data packets in the M data packets to the access network device via a first relay terminal using a first relay link, wherein the first relay link includes a first link and a second link, the first link is a link between the terminal device and the first relay terminal, and the second link is a link between the first relay terminal and the access network device; and
sending, by the terminal device, request information to the access network device in response to the terminal device determining a link quality of the first link is less than or equal to a first preset Signed and Sealed this
Twenty-third Day of December, 2025

John A. Squires
*Director of the United States Patent and Trademark Office* threshold, wherein the request information requests updating the first relay link to a second relay link for sending the M–N data packets to the access network via a second relay terminal using the second relay link, the second relay link includes a third link and a fourth link, the third link is a link between the terminal device and the second relay terminal, and the fourth link is a link between the second relay terminal and the access network device.

2. The method according to claim 1, wherein the first data packet belongs to a first service, and the method further comprises:
sending, by the terminal device, first indication information to the access network device, wherein the first indication information includes at least one of the following: a type identifier of the first service, a quality of service requirement of the first service, a type of the terminal device, location information of the terminal device, or the link quality of the first link.

3. The method according to claim 1, wherein the request information includes at least one of the following: an identifier of the second relay terminal, an identifier of a PC5 interface between the terminal device and the second relay terminal, a link identifier of the third link, or a link quality of the third link.

4. The method according to claim 1, wherein the method further comprises:
sending, by the terminal device, capability information to the access network device, wherein the capability information indicates at least one of the following capabilities:
the terminal device supports communication with the access network device over a relay link;
the terminal device supports first duplication transmission, wherein at least one link for the first duplication transmission is the first relay link or the second relay link;
the terminal device supports second duplication transmission, wherein the second duplication transmission performs carrier aggregation duplication transmission using at least one of the first relay link or the second relay link;
a maximum quantity of relay links that are used for duplication transmission and that are supported by the terminal device; and
a maximum quantity of relay terminals that are used for duplication transmission and that are supported by the terminal device.

5. The method according to claim 1, wherein the method further comprises:
sending, by the terminal device, second indication information to the access network device, wherein the second indication information indicates at least one of the following: an identifier of at least one of the first relay terminal or the second relay terminal that establishes the first relay link or the second relay link, respectively, with the terminal device, an identifier of a PC5 interface of the at least one first relay terminal or second relay terminal that establishes the first relay link or the second relay link, respectively, with the terminal device, an identifier of the first relay link or second relay link of the at least one first relay terminal or second relay terminal, respectively, established with the terminal device, and a link quality of at least one of the first relay link or second relay link established with the terminal device.

6. The method according to claim 1, wherein the method further comprises:
receiving, by the terminal device, third indication information from the access network device, wherein the third indication information indicates an identifier of the first relay terminal that establishes the first relay link with the terminal device, an identifier of a PC5 interface of the first relay link that is established with the terminal device, or an identifier of the first link.

7. The method according to claim 6, wherein the method further comprises:
sending, by the terminal device, fourth indication information to the first relay terminal, wherein the fourth indication information indicates the first relay terminal is to establish the second link with the access network device.

8. A terminal device, comprising: at least one processor and at least one memory storing instructions; wherein the instructions are executed by the at least one processor to perform operations of:
determining a first data packet, obtaining M data packets through duplicating the first data packet, and sending the M data packets to an access network device in a duplication transmission mode, wherein M is an integer greater than 1, wherein
the sending the M data packets to an access network device in a duplication transmission mode includes:
sending N data packets in the M data packets to the access network device through an air interface, wherein N is an integer greater than 0 and less than M; and
sending M–N data packets in the M data packets to the access network device via a first relay terminal using a first relay link, wherein the first relay link includes a first link and a second link, the first link is a link between the at least one processor and the first relay terminal, and the second link is a link between the first relay terminal and the access network device; and
sending request information to the access network device in response to determining a link quality of the first link is less than or equal to a first preset threshold, wherein the request information requests updating the first relay link to a second relay link for sending the M–N data packets to the access network via a second relay terminal using the second relay link, the second relay link includes a third link and a fourth link, the third link is a link between the at least one processor and the second relay terminal, and the fourth link is a link between the second relay terminal and the access network device.

9. The terminal device according to claim 8, wherein the first data packet belongs to a first service, and the at least one processor is further configured to perform the operations of:
sending first indication information to the access network device, wherein
the first indication information includes at least one of the following: a type identifier of the first service, a quality of service requirement of the first service, a type of the terminal device, location information of the at least one processor, or the link quality of the first link.

10. The terminal device according to claim 8, wherein the request information includes at least one of the following: an identifier of the second relay terminal, an identifier of a PC5 interface between the at least one processor and the second relay terminal, a link identifier of the third link, or a link quality of the third link.

11. The terminal according to claim 8, wherein the at least one processor is further configured to perform the operations of:
sending capability information to the access network device, wherein the capability information indicates at least one of the following capabilities:
the at least one processor supports communication with the access network device over at least one of the first relay link or the second relay link;
the at least one processor supports first duplication transmission, wherein at least one link for the first duplication transmission is at least one of the first relay link or the second relay link;
the at least one processor supports second duplication transmission, wherein the second duplication transmission performs carrier aggregation duplication transmission using at least one of the first relay link or the second relay link;
a maximum quantity of relay links that are used for duplication transmission and that are supported by the at least one processor; and
a maximum quantity of relay terminals that are used for duplication transmission and that are supported by the at least one processor.

12. The terminal device according to claim 8, wherein the at least one processor is further configured to perform the operations of:
sending second indication information to the access network device, wherein the second indication information indicates at least one of the following: an identifier of at least one of the first relay terminal or the second relay terminal that establishes the first relay link or the second relay link, respectively, with the at least one processor, an identifier of a PC5 interface of the at least one first relay terminal or second relay terminal that establishes the first relay link or the second relay link, respectively, with the at least one processor, an identifier of the first relay link or the second relay link of the at least one first relay terminal or second relay terminal. respectively, established with the at least one processor, and a link quality of at least one of the first relay link or the second relay link established with the at least one processor.

13. The terminal device according to claim 8, wherein the at least one processor is further configured to perform the operations of:
receiving third indication information from the access network device, wherein the third indication information indicates an identifier of the first relay terminal that establishes the first relay link with the at least one processor, an identifier of a PC5 interface of the first relay link that is established with the at least one processor, or an identifier of the first link.

14. The terminal device according to claim 13, wherein the at least one processor is further configured to perform the operations of:
sending fourth indication information to the first relay terminal, wherein the fourth indication information indicates the first relay terminal is to establish the second link with the access network device.

15. An access network device, comprising: at least one processor and at least one memory storing instructions; wherein the instructions are executed by the at least one processor to perform operations of:
receiving M data packets from a terminal device in a duplication transmission mode, wherein M is an integer greater than 1, wherein
the receiving M data packets from the terminal device in a duplication transmission mode includes:
receiving, through an air interface, N data packets in the M data packets from the terminal device, wherein the M data packets are received in the duplication transmission mode, and N is an integer greater than 0 and less than M; and
receiving, via a first relay terminal, M-N data packets in the M data packets over a first relay link, wherein the first relay link includes a first link and a second link, the first link is a link between the terminal device and the first relay terminal, and the second link is a link between the first relay terminal and the at least one processor; and
receiving request information, wherein the request information requests updating the first relay link to a second relay link for receiving the M-N data packets from the terminal device via a second relay terminal using the second relay link, the second relay link includes a third link and a fourth link, the third link is a link between the terminal device and the second relay terminal, and the fourth link is a link between the second relay terminal and the at least one processor.

16. The access network device according to claim 15, wherein the M data packets belong to a first service, and the at least one processor is further configured to perform the operations of:
receiving first indication information from the terminal device, wherein
the first indication information includes at least one of the following: a type identifier of the first service, a quality of service requirement of the first service, a type of the terminal device, location information of the terminal device, or a link quality of the first link.

17. The access network device according to claim 15, wherein the request information includes at least one of the following: an identifier of the second relay terminal, an identifier of a PC5 interface between the terminal device and the second relay terminal, a link identifier of the third link, or a link quality of the third link.

18. The access network device according to claim 15, wherein the at least one processor is further configured to perform the operations of:
receiving capability information from the terminal device, wherein the capability information indicates at least one of the following:
the terminal device supports communication with the at least one processor over at least one of the first relay link or the second relay link;
the terminal device supports first duplication transmission, wherein at least one link for the first duplication transmission is at least one of the first relay link or the second relay link;
the terminal device supports second duplication transmission, wherein the second duplication transmission performs carrier aggregation duplication transmission using at least one of the first relay link or the second relay link;

a maximum quantity of relay links that are used for duplication transmission and that are supported by the terminal device; and
a maximum quantity of relay terminals that are used for duplication transmission and that are supported by the terminal device.

19. The access network device according to claim 15, wherein the at least one processor is further configured to perform the operations of:
receiving second indication information from the terminal device, wherein the second indication information indicates at least one of the following: an identifier of at least one of the first relay terminal or the second relay terminal that establishes the first relay link or the second relay link, respectively, with the terminal device, an identifier of a PC5 interface of the at least one first relay terminal or second relay terminal that establishes the first relay link or the second relay link, respectively, with the terminal device, an identifier of the first relay link or the second relay link of the first relay terminal or the second relay terminal, respectively, established with the terminal device, and a link quality of at least one of the first relay link or the second relay link established with the terminal device.

20. The access network device according to claim 15, wherein the at least one processor is further configured to perform the operations of:
sending third indication information to the terminal device, wherein the third indication information indicates an identifier of the first relay terminal that establishes the first relay link with the terminal device, an identifier of a PC5 interface of the first relay link that is established with the terminal device, or an identifier of the first link.